United States Patent
Kaji et al.

(10) Patent No.: US 10,190,923 B2
(45) Date of Patent: *Jan. 29, 2019

(54) STRAIN SENSING ELEMENT, PRESSURE SENSOR, MICROPHONE, BLOOD PRESSURE SENSOR, AND TOUCH PANEL

(71) Applicant: KABUSHIKI KAISHA TOSHIBA, Tokyo (JP)

(72) Inventors: Shiori Kaji, Kawasaki (JP); Hideaki Fukuzawa, Kawasaki (JP); Yoshihiko Fuji, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,668

(22) Filed: Dec. 27, 2017

(65) Prior Publication Data

US 2018/0120172 A1 May 3, 2018

Related U.S. Application Data

(63) Continuation of application No. 14/333,906, filed on Jul. 17, 2014, now Pat. No. 9,897,494.

(30) Foreign Application Priority Data

Sep. 20, 2013 (JP) ................................. 2013-196081

(51) Int. Cl.
*G01L 1/12* (2006.01)
*G01L 9/16* (2006.01)

(52) U.S. Cl.
CPC . *G01L 1/12* (2013.01); *G01L 9/16* (2013.01)

(58) Field of Classification Search
CPC .................................. G01L 1/12; G01L 9/16
(Continued)

(56) References Cited

U.S. PATENT DOCUMENTS 5,891,586 A 4/1999 Hasegawa
6,988,414 B2 1/2006 Ruhrig
(Continued)

FOREIGN PATENT DOCUMENTS

JP 2001-237473 A 8/2001
JP 2002-148132 A 5/2002
(Continued)

OTHER PUBLICATIONS

D. Meyners, et al., "Pressure sensor based on magnetic tunnel junctions", Journal of Applied Physics, vol. 105, 2009, pp. 07C914-1 to 07C914-3.
(Continued)

*Primary Examiner* — Jonathan Dunlap
*Assistant Examiner* — Octavia Hollington
(74) *Attorney, Agent, or Firm* — Oblon, McClelland, Maier & Neustadt, L.L.P.

(57) ABSTRACT

The disclosure relates to a strain sensing element provided on a deformable substrate. The strain sensing element includes: a first magnetic layer; a second magnetic layer; and an intermediate layer. The second magnetic layer includes $Fe_{1-y}B_y$ ($0<y\leq0.3$). Magnetization of the second magnetic layer changes according to deformation of the substrate. The intermediate layer is provided between the first magnetic layer and the second magnetic layer.

19 Claims, 15 Drawing Sheets

(58) Field of Classification Search
USPC .................................. 73/777, 779, 862.69
See application file for complete search history.

(56) References Cited

U.S. PATENT DOCUMENTS

| | | | |
|---|---|---|---|
| 6,995,961 B2 | 2/2006 | Hasegawa | |
| 7,807,218 B2 | 10/2010 | Parkin | |
| 8,604,569 B2 | 12/2013 | Hosotani | |
| 8,917,485 B2 * | 12/2014 | Fukuzawa | B82Y 25/00 360/324.1 |
| 8,958,574 B2 | 2/2015 | Fukuzawa | |
| 9,028,909 B2 | 5/2015 | Fukuzawa | |
| 9,422,150 B2 | 8/2016 | Okamoto | |
| 9,651,432 B2 * | 5/2017 | Fuji | G01L 9/007 |
| 9,921,114 B2 * | 3/2018 | Fuji | G01L 1/2287 |
| 2006/0003185 A1 | 1/2006 | Parkin | |
| 2009/0122450 A1 | 5/2009 | Wang et al. | |
| 2010/0233515 A1 | 9/2010 | Kong | |
| 2011/0188157 A1 | 8/2011 | Zhao et al. | |
| 2011/0295128 A1 | 12/2011 | Yuasa et al. | |
| 2012/0079887 A1 | 4/2012 | Giddings et al. | |
| 2012/0245477 A1 | 9/2012 | Giddings et al. | |
| 2013/0255393 A1 | 10/2013 | Fukuzawa et al. | |
| 2015/0082918 A1 | 3/2015 | Fuji et al. | |

FOREIGN PATENT DOCUMENTS

| | | |
|---|---|---|
| JP | 2006-295000 A | 10/2006 |
| JP | 2009-094104 A | 4/2009 |
| JP | 2009-111396 A | 5/2009 |
| JP | 2009-117846 A | 5/2009 |
| JP | 2010-080806 A | 4/2010 |
| JP | 2011-159973 A | 8/2011 |
| JP | 2011-244938 A | 12/2011 |
| JP | 2012-078186 A | 4/2012 |
| JP | 2012-160681 A | 8/2012 |
| JP | 2012-176294 A | 9/2012 |
| JP | 2012-204479 A | 10/2012 |
| JP | 2013-33881 A | 2/2013 |
| JP | 2013-72712 A | 4/2013 |
| JP | 2013-205403 A | 10/2013 |
| JP | 2015-61056 A | 3/2015 |

OTHER PUBLICATIONS

M. Lohndorf, et al., "Highly sensitive strain sensors based on magnetic tunneling junctions", Applied Physics Letters, vol. 81, No. 2, Jul. 8, 2002, pp. 313-315.

* cited by examiner

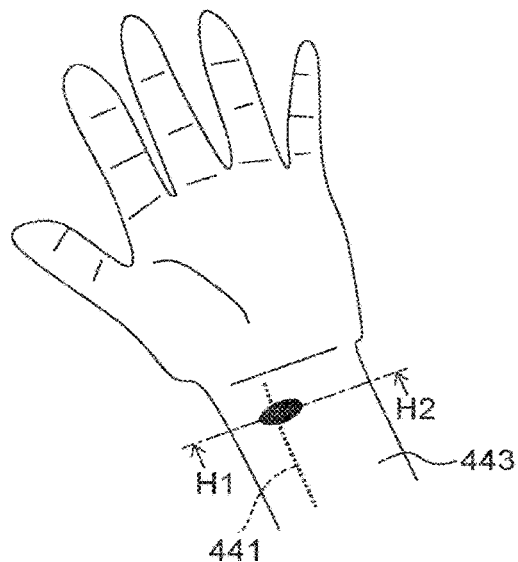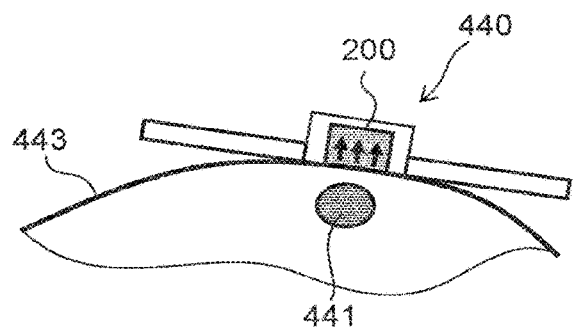
FIG. 16A    FIG. 16B
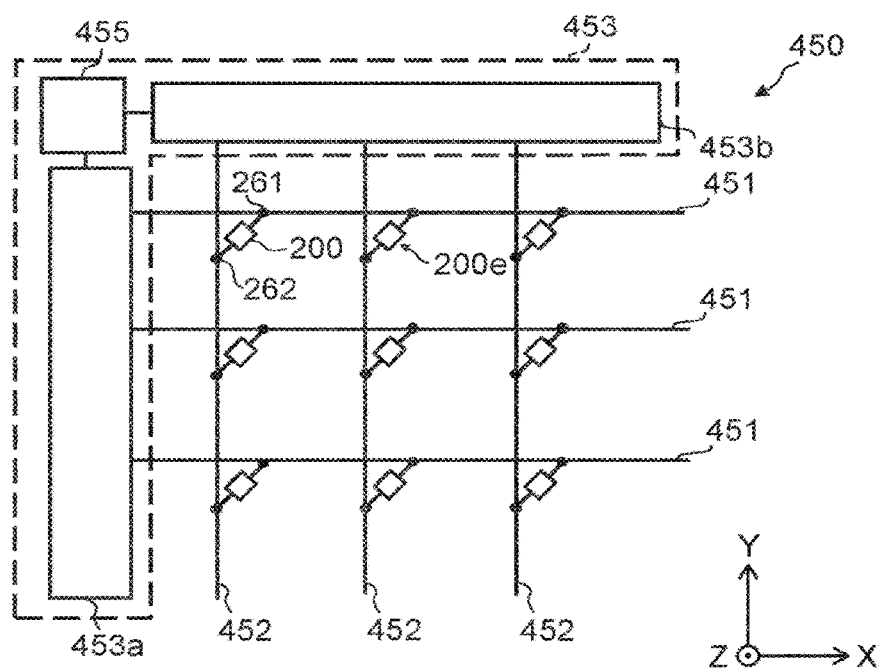
FIG. 17

STRAIN SENSING ELEMENT, PRESSURE SENSOR, MICROPHONE, BLOOD PRESSURE SENSOR, AND TOUCH PANEL

CROSS-REFERENCE TO RELATED APPLICATIONS

This application is a continuation application of U.S. application Ser. No. 14/333,906 filed Jul. 17, 2014, which is based upon and claims the benefit of priority from Japanese Patent Application No. 2013-196081, filed on Sep. 20, 2013; the entire contents of which are incorporated herein by reference.

FIELD

Embodiments described herein relate generally to a strain sensing element, a pressure sensor, a microphone, a blood pressure sensor, and a touch panel.

BACKGROUND

A pressure sensor that uses a MEMS (Micro Electro Mechanical Systems) technology includes, for example, a piezoresistance change type and an electrostatic capacitance type. On the other hand, a pressure sensor that uses a spin technology has been proposed. In the pressure sensor using the spin technology, a resistance change corresponding to strain is sensed. The sensitivity of the resistance change corresponding to the strain depends on a material of a spin valve film, for example. For example, in a strain sensing element that is used in the pressure sensor or the like using the spin technology, it is desirable to enhance the sensitivity.

BRIEF DESCRIPTION OF THE DRAWINGS

FIG. 16A and FIG. 16B are schematic views illustrating the blood pressure sensor according to a fifth embodiment; and FIG. 17 is a schematic plan view illustrating a touch panel according to a sixth embodiment.

DETAILED DESCRIPTION

Figure 1A:
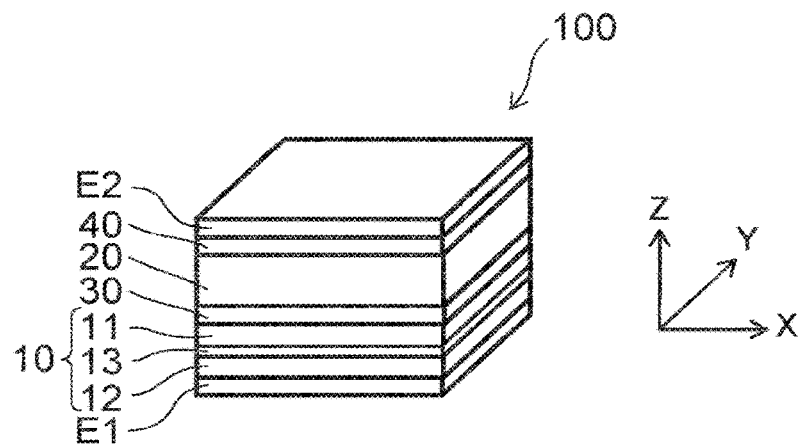
FIGS. 1A to 1C are schematic diagrams illustrating a strain sensing element according to a first embodiment.

In general, according to one embodiment, a strain sensing element provided on a deformable substrate, includes: a first magnetic layer; a second magnetic layer; and an intermediate layer. The second magnetic layer includes $Fe_{1-y}B_y$ ($0<y\leq0.3$). Magnetization of the second magnetic layer changes according to deformation of the substrate. The intermediate layer is provided between the first magnetic layer and the second magnetic layer.

Hereinafter, embodiments of the invention will be described with reference to the accompanying drawings.

The drawings are schematic or conceptual; and the relationship between the thickness and the width of each portion, the proportion of sizes between portions, or the like is not necessarily the same as in actual portions. Further, the dimensions and/or the proportions may be illustrated differently between the drawings, even for identical portions.

In the drawings and the specification of the application, components similar to those described in regard to a preceding drawing are marked with like reference numerals, and detailed description thereof is omitted as appropriate.

First Embodiment

Figure 1B:
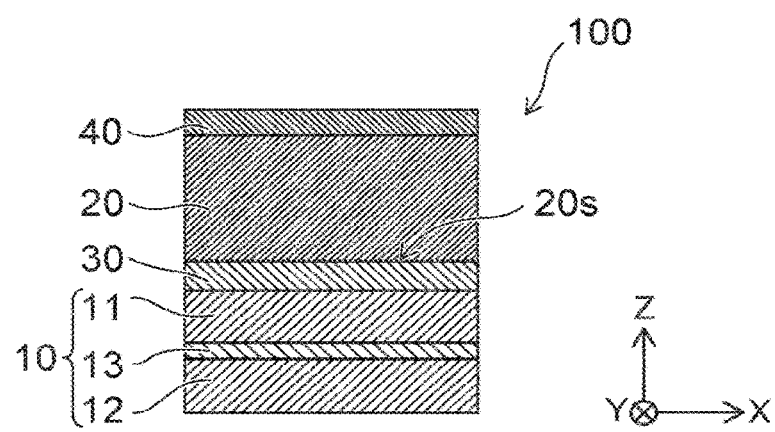
Figure 1C:
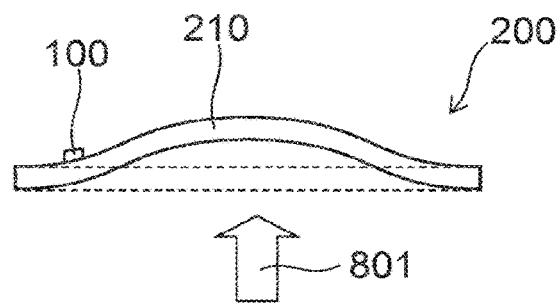

FIGS. 1A to 1C are schematic diagrams illustrating a strain sensing element according to a first embodiment.

FIG. 1A is a schematic perspective view of the strain sensing element. FIG. 1B is a schematic cross-sectional view of the strain sensing element. FIG. 1C is a schematic cross-sectional view illustrating a pressure sensor in which the strain sensing element is used. In FIG. 1B, for ease of description, a first electrode and a second electrode are not shown.

As illustrated in FIG. 1A, a strain sensing element 100 according to the embodiment includes a first magnetic layer 10, a second magnetic layer 20, and an intermediate layer 30. In the example, the strain sensing element 100 further includes a functional layer 40, a first electrode E1, and a second electrode E2. The functional layer 40 may not be provided.

For example, a direction from the first magnetic layer 10 to the second magnetic layer 20 is taken as a Z-axis direction (a stacking direction). One direction perpendicular to the Z-axis direction is taken as an X-axis direction. A direction perpendicular to the Z-axis direction and the X-axis direction is taken as a Y-axis direction.

In the example, the second electrode E2 is separated from the first electrode E1 in the stacking direction. The first magnetic layer 10 is provided between the first electrode E1 and the second electrode E2. The intermediate layer 30 is provided between the first magnetic layer 10 and the second electrode E2. The second magnetic layer 20 is provided between the intermediate layer 30 and the second electrode E2. The functional layer 40 is provided between the second magnetic layer 20 and the second electrode E2. The functional layer 40 includes a non-magnetic layer or any material except for a non-magnetic material.

The first magnetic layer 10 and the second magnetic layer 20 may be switched in their positions with the intermediate layer 30 being interposed therebetween. In such a case, the functional layer 40 is provided between the second magnetic layer 20 and the first electrode E1.

The first magnetic layer 10 serves as a reference layer, for example. A magnetization fixed layer or a magnetization free layer is used as the reference layer. As illustrated in FIG. 1A and FIG. 1B, the first magnetic layer 10 is a magnetization fixed layer. For example, the first magnetic layer 10 includes, for example, a synthetic pinned structure or a single pinned structure. In the example, the first magnetic layer 10 includes the synthetic pinned structure. As described later, the first magnetic layer 10 may be a magnetization free layer.

In the example illustrated in FIG. 1A and FIG. 1B, the first magnetic layer 10 includes a first magnetization fixed layer 11, a second magnetization fixed layer 12, and a magnetic coupling layer 13. The magnetic coupling layer 13 is provided between the first magnetization fixed layer 11 and the second magnetization fixed layer 12.

The second magnetization fixed layer 12 includes, for example, a $Co_xFe_{100-x}$ alloy (x being 0 at. % or more and 100 at. % or less), a $Ni_xFe_{100-x}$ alloy (x being 0 at. % or more and 100 at. % or less), or a material in which a nonmagnetic element is added to these alloys. For example, at least one selected from the group consisted of Co, Fe and Ni is used as the second magnetization fixed layer 12. An alloy including at least one selected from these materials may be used as the second magnetization fixed layer 12. The second magnetization fixed layer 12 may include, for example, a $(Co_xFe_{100-x})_{100-y}B_y$ alloy (x being 0 at. % or more and 100 at. % or less and y being 0 at. % or more and 30 at. % or less).

When the single pinned structure is used in the first magnetic layer 10, the same material as in the second magnetization fixed layer 12 described above may be used as a ferromagnetic layer used in the magnetization fixed layer of the single pinned structure.

The magnetic coupling layer 13 causes antiferromagnetic coupling to occur between the second magnetization fixed layer 12 and the first magnetization fixed layer 11. For example, Ru is used as the magnetic coupling layer 13. A material other than Ru may be used as the magnetic coupling layer 13 as long as the material can cause sufficient antiferromagnetic coupling to occur between the first magnetization fixed layer 11 and the second magnetization fixed layer 12. For example, Ru having a thickness of 0.9 nm is used as the magnetic coupling layer 13. Thus, highly reliable coupling is obtained stably.

A magnetic layer that is used in the first magnetization fixed layer 11 contributes directly to a magnetoresistance effect (MR effect). For example, a Co—Fe—B alloy is used as the first magnetization fixed layer 11. Specifically, a $(Co_xFe_{100-x})_{100-y}B_y$ alloy (x being 0 at. % or more and 100 at. % or less and y being 0 at. % or more and 30 at. % or less) may be used as the first magnetization fixed layer 11.

For example, an Fe—Co alloy other than the Co—Fe—B alloy may be used as the first magnetization fixed layer 11.

Instead of the materials described above, the first magnetization fixed layer 11 may include a $Co_{90}Fe_{10}$ alloy having an fcc structure, Co having an hcp structure, or a Co alloy having an hcp structure. At least one selected from the group consisted of Co, Fe and Ni may be used as the first magnetization fixed layer 11. An alloy including at least one material selected from these materials may be used as the first magnetization fixed layer 11. For example, a higher MR change ratio is obtained by using an Fe—Co alloy material having a bcc structure, a Co alloy including a cobalt composition of 50 at. % or more, or a material having a Ni composition of 50 at. % or more (Ni alloy) as the first magnetization fixed layer 11.

For example, a Heusler magnetic alloy layer made of $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, $Co_2FeGa_{0.5}Ge_{0.5}$, or the like may be used as the first magnetization fixed layer 11. For example, a $Co_{40}Fe_{40}B_{20}$ layer having a thickness of 3 nm may be used as the first magnetization fixed layer 11.

The second magnetic layer 20 serves as a magnetization free layer, for example. If stress is applied to the strain sensing element 100, strain occurs in the strain sensing element 100, and thus, the magnetization of the second magnetic layer 20 is changed. For example, the change of the magnetization of the second magnetic layer 20 occurs more easily than the change of the magnetization of the first magnetic layer 10. Thus, a relative angle between the magnetization of the first magnetic layer 10 and the magnetization of the second magnetic layer 20 is changed.

The second magnetic layer 20 may include a ferromagnetic material.

In the embodiment, the second magnetic layer 20 includes $Fe_{1-y}B_y$ ($0<y\leq0.3$). The entirety of the second magnetic layer 20 may be formed by $Fe_{1-y}B_y$ ($0<y\leq0.3$). For example, $Fe_{1-y}B_y$ ($0<y\leq0.3$) may be provided in a region that includes an interface 20s between the second magnetic layer 20 and the intermediate layer 30 in the second magnetic layer 20.

The second magnetic layer 20 may include a material in which a part of Fe in $Fe_{1-y}B_y$ ($0<y\leq0.3$) is replaced with Co or Ni, that is, $(Fe_aX_{1-a})_{1-y}B_y$ ($0.8\leq a<1$, $0<y\leq0.3$). In the above-described $(Fe_aX_{1-a})_{1-y}B_y$, X is Co or Ni. That is, the second magnetic layer 20 may include $(Fe_aCo_{1-a})_{1-y}B_y$ ($0.8\leq a<1$, $0<y\leq0.3$) or $(Fe_aNi_{1-a})_{1-y}B_y$ ($0.8\leq a<1$, $0<y\leq0.3$).

The entirety of the second magnetic layer 20 may be formed by $(Fe_aX_{1-a})_{1-y}B_y$ ($0.8\leq a<1$, $0<y\leq0.3$). That is, the entirety of the second magnetic layer 20 may be formed by $(Fe_aCo_{1-a})_{1-y}B_y$ ($0.8\leq a<1$, $0<y\leq0.3$). Alternatively, the entirety of the second magnetic layer 20 may be formed by $(Fe_aNi_{1-a})_{1-y}B_y$ ($0.8\leq a<1$, $0<y\leq0.3$). For example, $(Fe_aX_{1-a})_{1-y}B_y$ ($0.8\leq a<1$, $0<y\leq0.3$) may be provided in the region that includes the interface 20s.

The second magnetic layer 20 may include both of $Fe_{1-y}B_y$ ($0<y\leq0.3$) and $(Fe_aX_{1-a})_{1-y}B_y$ ($0.8\leq a<1$, $0<y\leq0.3$). In a case where X is Co, it is preferable that $(Fe_aCo_{1-a})_{1-y}B_y$ ($0.8\leq a<1$, $0<y\leq0.3$) be provided in the region that includes the interface 20s.

The second magnetic layer 20 may include $Co_{40}Fe_{40}B_{20}$. In such a case, $Co_{40}Fe_{40}B_{20}$ is provided in the region that includes the interface 20s.

For example, the second magnetic layer 20 includes both of $Fe_{1-y}B_y$ ($0<y\leq0.3$) and $Co_{40}Fe_{40}B_{20}$. $Co_{40}Fe_{40}B_{20}$ is provided in the region that includes the interface 20s. Alternatively, the second magnetic layer 20 may include both of $(Fe_aNi_{1-a})_{1-y}B_y$ ($0.8\leq a<1$, $0<y\leq0.3$) and $Co_{40}Fe_{40}B_{20}$. $Co_{40}Fe_{40}B_{20}$ is provided in the region that includes the interface 20s.

The second magnetic layer 20 includes an amorphous portion. For example, $Fe_{1-y}B_y$ ($0<y\le0.3$) includes an amorphous state. For example, $(Fe_aX_{1-a})_{1-y}B_y$ ($0.8\le a<1$, $0<y\le0.3$) includes the amorphous state.

The second magnetic layer 20 may include the amorphous portion and a crystalline portion. For example, the region that includes the interface 20s includes the crystalline portion, and a region that does not include the interface 20s includes the amorphous state.

The intermediate layer 30 disconnects the magnetic coupling between the first magnetic layer 10 and the second magnetic layer 20, for example. The intermediate layer 30 may include a metal, an insulator or a semiconductor, for example. For example, Cu, Au, Ag or the like may be used as the metal. In a case where the metal is used as the intermediate layer 30, the thickness of the intermediate layer 30 is, for example, about 1 nm or more and about 7 nm or less. For example, magnesium oxide (Mg—O, etc.), aluminum oxide ($Al_2O_3$, etc.), titanium oxide (Ti—O, etc.), zinc oxide (Zn—O, etc.), gallium oxide (Ga—O), or the like may be used as the insulator or the semiconductor. In a case where the insulator or the semiconductor is used as the intermediate layer 30, the thickness of the intermediate layer 30 is, for example, about 0.6 nm or more and about 2.5 nm or less. For example, a current-confined-path (CCP) spacer layer may be used as the intermediate layer 30. In a case where the CCP spacer layer is used as the intermediate layer 30, for example, a structure in which a copper (Cu) metal path is formed in an insulting layer of aluminum oxide ($Al_2O_3$) is used. For example, an MgO layer having a thickness of 1.5 nm may be used as the intermediate layer 30.

The functional layer 40 may include, for example, at least one of oxide, nitride and oxynitride. The functional layer 40 includes at least one of oxide of at least one selected from a first group consisted of magnesium (Mg), aluminum (Al), silicon (Si), titanium (Ti), vanadium (V), chrome (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), hafnium (Hf), tantalum (Ta), tungsten (W), tin (Sn), cadmium (Cd) and gallium (Ga), and nitride of at least one selected from the first group, for example.

The functional layer 40 may include oxide of at least one selected from a second group consisted of magnesium, titanium, vanadium, zinc, tin, cadmium and gallium, for example. The functional layer 40 may include, for example, magnesium oxide in which low resistance is easily obtained. It is preferable that the functional layer 40 includes MgO.

The first electrode E1 and the second electrode E2 include, for example, at least one selected from aluminum (Al), an aluminum copper alloy (Al—Cu), copper (Cu), silver (Ag) and gold (Au). A current can be made to efficiently flow in the strain sensing element 100 by using such a material that has a relatively small electrical resistance as the first electrode E1 and the second electrode E2. The first electrode E1 may include a nonmagnetic material.

For example, the first electrode E1 may have a foundation layer (not shown) for the first electrode E1, a capping layer (not shown) for the first electrode E1, and a layer that is provided between the foundation and the capping layer and is made of at least one selected from Al, Al—Cu, Cu, Ag and Au. For example, the first electrode E1 includes tantalum (Ta)/copper (Cu)/tantalum (Ta), or the like. By using Ta as the foundation layer for the first electrode E1, it is possible to improve adhesion between a substrate 210 and the first electrode E1, for example. Titanium (Ti), titanium nitride (TiN) or the like may be used as the foundation layer for the first electrode E1.

By using Ta as the capping layer of the first electrode E1, it is possible to prevent oxidization of the copper (Cu) or the like under the capping layer. Titanium (Ti), titanium nitride (TiN) or the like may be used as the capping layer for the first electrode E1.

A current can be caused to flow in the stacked body including the first magnetic layer 10, the intermediate layer 30 and the second magnetic layer 20 by applying a voltage between the first electrode E1 and the second electrode E2. The current flows between the first magnetic layer 10 and the second magnetic layer 20, for example, along the Z-axis direction.

A pinning layer (not shown) may be provided between the first electrode E1 and the first magnetic layer 10. The pinning layer provides unidirectional anisotropy to the first magnetic layer 10 (ferromagnetic layer) formed on the pinning layer to fix the magnetization of the first magnetic layer 10. The pinning layer includes, for example, an antiferromagnetic layer. The pinning layer includes, for example, at least one selected from the group consisted of Ir—Mn, Pt—Mn, PdPtMn, and Ru—Rh—Mn. The thickness of the pinning layer is set appropriately to provide unidirectional anisotropy of sufficient strength.

As shown in FIG. 1C, the strain sensing element 100 is used in a pressure sensor 200. The pressure sensor 200 includes a substrate 210 and the strain sensing element 100. The substrate 210 has a flexible region. The strain sensing element 100 is provided on a part of the substrate 210.

In the specification, the "provided on" state includes a state where a first component is provided in direct contact with a second component and a state where a third component is interposed between the first component and the second component.

If a force 801 is applied to the substrate 210, the substrate 210 is deformed. Strain occurs in the strain sensing element 100 according to the deformation of the substrate 210.

In the strain sensing element 100 according to the embodiment, for example, if the substrate 210 is deformed due to an external force, strain occurs in the strain sensing element 100. The strain sensing element 100 converts a change of the strain into a change of an electrical resistance.

The operation of the strain sensing element 100 functioning as a strain sensor is based on an application of an "inverse-magnetostriction effect" and a "magnetoresistance effect". The "inverse-magnetostriction effect" is obtained in the ferromagnetic layer used in the magnetization free layer. The "magnetoresistance effect" occurs in the stacked film of the magnetization free layer, the intermediate layer and the reference layer (for example, magnetization fixed layer).

The "inverse-magnetostriction effect" is a phenomenon in which the magnetization of a ferromagnet is changed by strain that occurs in the ferromagnet. In other words, when external strain is applied to the stacked body of the strain sensing element 100, the magnetization direction of the magnetization free layer changes. As a result, the relative angle between the magnetization of the magnetization free layer and the magnetization of the reference layer (for example, magnetization fixed layer) changes. Here, the change of the electrical resistance is caused by the "magnetoresistance effect (MR effect)". The MR effect includes, for example, a giant magnetoresistance (GMR) effect, a tunneling magnetoresistance (TMR) effect, or the like. As a current flows in the stacked body, the change of the relative angle of the magnetization direction is read as the change of the electrical resistance, so that the MR effect occurs. For example, strain occurs in the stacked body (the strain sensing element 100), and thus, the magnetization direction of the magnetization free layer is changed due to the strain. Thus, the relative angle between the magnetization direction of the magnetization free layer and the magnetization direction of the reference layer (for example, magnetization fixed layer) is changed. In other words, the MR effect occurs due to the inverse-magnetostriction effect.

In a case where the ferromagnetic material used in the magnetization free layer has a positive magnetostriction constant, the magnetization direction changes so that the angle between the magnetization direction and a tensile strain direction becomes small and the angle between the magnetization direction and a compressive strain direction becomes large. In a case where the ferromagnetic material used in the magnetization free layer has a negative magnetostriction constant, the magnetization direction changes so that the angle between the magnetization direction and the tensile strain direction becomes large and the angle between the magnetization direction and the compressive strain direction becomes small.

Hereinafter, a case where the resistance decreases when the ferromagnetic materials used in the magnetization free layer and the reference layer (for example, magnetization fixed layer) respectively have positive magnetostriction constants and the relative angle formed by magnetization of the magnetization free layer, the intermediate layer, and the reference layer (for example, magnetization fixed layer) is small will be described with respect to an example of the change of the magnetization.

Figures 2A, 2B, 2C:
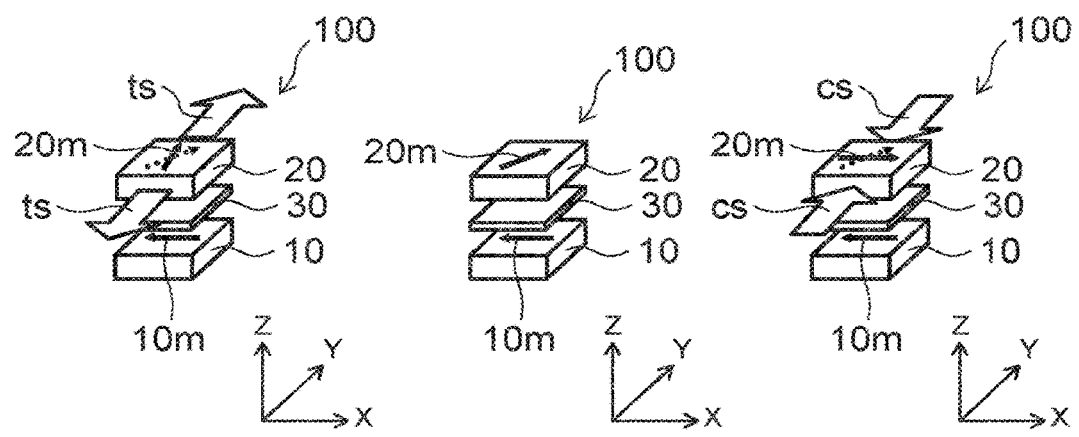
FIGS. 2A to 2C are schematic diagrams illustrating the operation of the strain sensing element according to the first embodiment.

FIGS. 2A to 2C are schematic diagrams illustrating the operation of the strain sensing element according to the first embodiment.

FIG. 2A corresponds to a state (a tensile state STt) when a tensile stress ts is applied to the strain sensing element 100. FIG. 2B corresponds to a state (a no-strain state ST0) when no strain is applied to the strain sensing element 100. FIG. 2C corresponds to a state (a compressive state STc) when a compressive stress cs is applied to the strain sensing element 100.

In FIGS. 2A to 2C, for ease of understanding, the first magnetic layer 10, the second magnetic layer 20 and the intermediate layer 30 are shown, and the functional layer 40, the first electrode E1 and the second electrode E2 are not shown. In the example, the second magnetic layer 20 is the magnetization free layer, and the first magnetic layer 10 is the magnetization fixed layer.

As illustrated in FIG. 2B, in the no-strain state ST0 (for example, an initial state) where strain does not occur, the relative angle between a magnetization 20m of the second magnetic layer 20 and a magnetization 10m of the first magnetic layer 10 (for example, magnetization fixed layer) is set to a predetermined value. The magnetization direction of the magnetic layer in the initial state is set by an external magnetic field, a hard bias, shape anisotropy of a magnetic layer or the like, for example. In the example, the magnetization 20m of the second magnetic layer 20 (magnetization free layer) and the magnetization 10m of the first magnetic layer 10 (for example, magnetization fixed layer) intersect with each other.

As illustrated in FIG. 2A, in the tensile state STt, if the tensile stress ts is applied, strain based on the tensile stress ts occurs in the strain sensing element 100. Here, the magnetization 20m of the second magnetic layer 20 (magnetization free layer) is changed from the no-strain state ST0 so that the angle between the magnetization 20m and the direction of the tensile stress ts becomes small. In the example illustrated in FIG. 2A, in a case where the tensile stress ts is applied, the relative angle between the magnetization 20m of the second magnetic layer 20 (magnetization free layer) and the magnetization 10m of the first magnetic layer 10 (for example, magnetization fixed layer) becomes small, compared with the no-strain state ST0. Thus, the electrical resistance in the strain sensing element 100 is reduced compared with the electrical resistance in the no-strain state ST0.

As illustrated in FIG. 2C, in the compressive state STc, if the compressive stress cs is applied, the magnetization 20m of the second magnetic layer 20 (magnetization free layer) is changed from the no-strain state ST0 so that the angle between the magnetization 20m and the direction of the compressive stress cs becomes large. In the example illustrated in FIG. 2C, in a case where the compressive stress cs is applied, the relative angle between the magnetization 20m of the second magnetic layer 20 (magnetization free layer) and the magnetization 10m of the first magnetic layer 10 (for example, magnetization fixed layer) becomes large, compared with the no-strain state ST0. Thus, the electrical resistance in the strain sensing element 100 is increased.

As described above, in the strain sensing element 100, the change of the strain that occurs in the strain sensing element 100 is converted into the change of the electrical resistance. In the above-described operation, a variation of electrical resistance (dR/R) per unit strain (dε) is referred to as a gauge factor (GF). It is possible to obtain a strain sensor of high sensitivity by using a strain sensing element having a high gauge factor.

Here, as described above, the change of the electrical resistance in the strain sensing element 100 is detected as the resistance change corresponding to the relative angle between the magnetization 20m of the second magnetic layer 20 (magnetization free layer) and the magnetization 10m of the first magnetic layer 10 (for example, magnetization fixed layer) by the strain that occurs in the strain sensing element 100. Accordingly, in order to realize the strain sensor of high sensitivity, it is necessary to increase the change of the magnetization due to the strain and to increase the resistance change depending on the difference of the relative angles between the magnetization of the first magnetic layer 10 and the magnetization of the second magnetic layer 20.

In order to easily move the magnetization of the magnetization free layer, it is desired that the magnetization free layer represents a soft magnetic property having no strong anisotropy. In order to easily move the magnetization of the magnetization free layer, it is favorable that the magnetization free layer have a structure having no magneto crystalline anisotropy.

On the other hand, in order to show a high magnetic resistance effect having a predetermined value or more, it is favorable that the magnetization free layer includes a crystalline structure.

A trade-off relationship having such a characteristic may hinder realization of improvement of the sensitivities of the strain sensing element 100 and the pressure sensor 200.

The sensitivity of the strain sensing element 100 depends on the materials of the first magnetic layer 10 and the second magnetic layer 20, or the like, for example. A magnetic material in which a large resistance change occurs with only a small strain is needed. However, there are relatively many magnetic materials showing an excellent characteristic with respect to each of the magnetostriction, soft magnetic property and magnetic resistance effect, but a magnetic material showing an excellent characteristic with respect to all of the magnetostriction, soft magnetic property and magnetic resistance effect is not well known. Accordingly, it may be difficult to improve the sensitivity of the strain sensing element.

On the other hand, in the strain sensing element 100 according to the embodiment, the second magnetic layer 20 includes $Fe_{1-y}B_y$ ($0<y\leq0.3$). Alternatively, the second magnetic layer 20 includes $(Fe_aX_{1-a})_{1-y}B_y$ ($0.8\leq a<1$, $0<y\leq0.3$). Alternatively, the second magnetic layer 20 includes both of $Fe_{1-y}B_y$ ($0\leq y<0.3$) and $(Fe_aX_{1-a})_{1-y}B_y$ ($0.8\leq a<1$, $0<y\leq0.3$). In $(Fe_aX_{1-a})_{1-y}B_y$, X is Co or Ni.

Accordingly, it is possible to achieve the magnetostriction, soft magnetic property and magnetic resistance effect together, and to achieve improvement of the sensitivity of the strain sensing element 100. Details thereof will be described later.

The amorphous state ideally does not have the magneto crystalline anisotropy, and shows an excellent soft magnetic property. It is known that amorphous based on Fe shows a relatively large magnetostriction. On the other hand, in order to achieve the magnetic resistance effect, crystallinity is needed in the interface 20s between the second magnetic layer 20 and the intermediate layer 30. If the region that includes the interface 20s in the second magnetic layer 20 has the crystallinity, it is possible to achieve a higher magnetic resistance effect.

Thus, in a case where the region that includes the interface 20s in the second magnetic layer 20 has the crystallinity and the region that does not include the interface 20s in the second magnetic layer 20 is in the amorphous state, it is possible to achieve the magnetostriction, soft magnetic property and magnetic resistance effect together. In a case where the second magnetic layer 20 includes both of $Fe_{1-y}B_y$ ($0\leq y<0.3$) and $(Fe_aX_{1-a})_{1-y}B_y$ ($0.8\leq a<1$, $0<y\leq0.3$), and in a case where X is Co, if $(Fe_aX_{1-a})_{1-y}B_y$ ($0.8\leq a<1$, $0<y\leq0.3$) is provided in the region that includes the interface 20s, it is possible to achieve the uniform magnetic resistance effect, and to achieve the soft magnetic property and the magnetostriction together. Accordingly, it is possible to achieve improvement of the sensitivity of the strain sensing element 100.

Information about distribution of the concentration of boron (B) in the second magnetic layer 20 is obtained by a secondary ion mass spectrometry (SIMS) analysis. The information may be obtained by combination of transmission electron microscopy (TEM) and energy-dispersive X-ray spectroscopy (EDX) for a cross-section. The information may be obtained by an electron energy loss spectroscopy (EELS) analysis. The information may also be obtained by a three-dimensional atom probe analysis.

In the strain sensing element 100 according to the embodiment, the second magnetic layer 20 is provided between the intermediate layer 30 and the functional layer 40. The material used in the functional layer 40 is as described above, for example. Accordingly, diffusion of boron (B) is suppressed, and the boron concentration in the second magnetic layer 20 is maintained. Thus, it is possible to suppress degradation of the property of the second magnetic layer 20. For example, in the strain sensing element 100, it is possible to obtain a smaller coercive force $H_c$ and a higher gauge factor by the magnetic change due to larger magnetostriction.

Next, an example of an experimental result of the strain sensing element 100 according to the embodiment will be described with reference to the accompanying drawings.

Figure 3A:
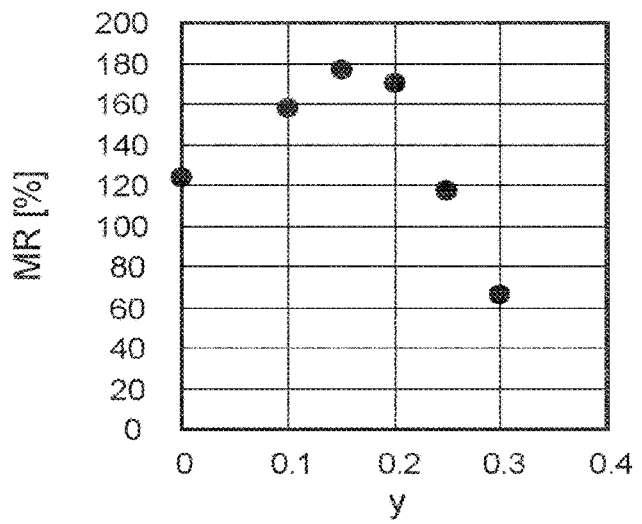
FIGS. 3A to 3C are graphs illustrating an example of an experimental result of the strain sensing element according to the embodiment.
Figure 3B:
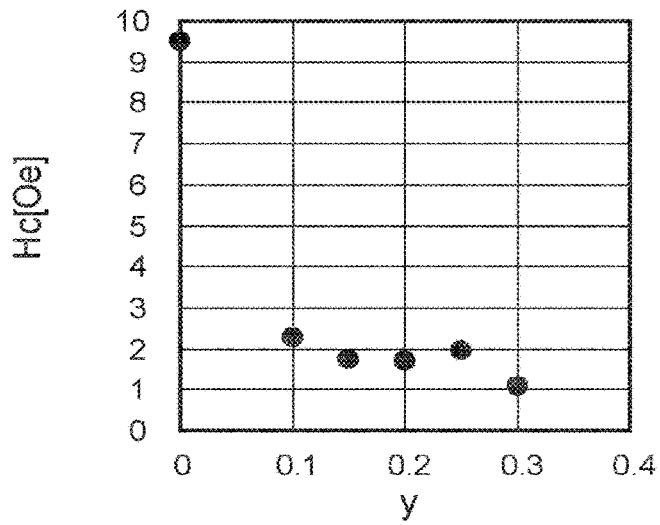
Figure 3C:
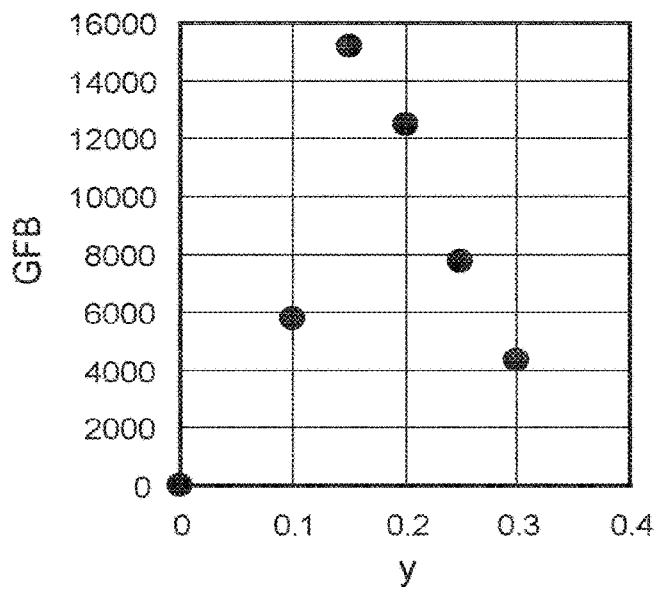

FIGS. 3A to 3C are graphs illustrating an example of an experimental result of the strain sensing element according to the embodiment.

The second magnetic layer 20 of the strain sensing element 100 in the examples of the experimental results in FIGS. 3A to 3C includes $Fe_{1-y}B_y$. Here, the examples of the experimental results relating to a composition ratio y of boron (B) are as illustrated in FIGS. 3A to 3C.

FIG. 3A is a diagram illustrating an example of the relationship between the MR change ratio and the composition ratio y of boron, in the strain sensing element according to the embodiment. FIG. 3B is a diagram illustrating an example of the relationship between the coercive force $H_c$ and the composition ratio y of boron, in the strain sensing element according to the embodiment. FIG. 3C is a diagram illustrating an example of the relationship between the gauge factor B (GFB) and the composition ratio y of boron.

The inventors performed evaluation of the strain sensing element 100 according to the embodiment using an index called the gauge factor B (GFB). The GFB is represented by a multiplier of the MR and the magnetic change ratio due to the strain, and is proportional to the gauge factor (GF) in principal. In other words, if the GFB is relatively large, a relatively high GF is obtained. If the GFB is relatively small, a relatively low GF is obtained. As described above with reference to FIGS. 2A to 2C, it is possible to obtain a strain sensor of high sensitivity by using a strain sensing element having a high gauge factor. In order to obtain the strain sensor of high sensitivity, a higher GF (larger GFB) is desired.

The coercive force $H_c$ is a characteristic index indicating the ease of magnetization rotation. In order to obtain the strain sensor of high sensitivity, a smaller coercive force $H_c$ is desired.

As described above with reference to FIGS. 1A to 1C, the MR effect is used for reading the change of the relative angle of the magnetization direction as the change of the electrical resistance. In order to obtain the strain sensor of high sensitivity, that is, in order to increase the resistance change depending on the difference of the relative angles between the magnetization of the first magnetic layer 10 and the magnetization of the second magnetic layer 20, a higher MR change ratio is desired.

As illustrated in FIG. 3A, in a case where the composition ratio y of boron is larger than 0.3, it can be understood that MR becomes relatively small. As illustrated in FIG. 3B, in a case where the composition ratio y of boron is 0.3, it can be understood that a relatively small coercive force $H_c$ is obtained. As illustrated in FIG. 3C, in a case where the composition ratio y of boron is 0.3, it can be understood that the magnetization change due to strain sufficiently occurs and a GFB of 4000 or more is obtained. Thus, it is favorable that the composition ratio y of boron of the second magnetic layer 20 be 0.3 or less.

On the other hand, as illustrated in FIG. 3A, in a case where the second magnetic layer 20 does not include boron (y=0), it can be understood that MR becomes relatively small. As illustrated in FIG. 3B, in a case where the second magnetic layer 20 does not include boron (y=0), it can be understood that the coercive force Hc is relatively large. As illustrated in FIG. 3C, in a case where the second magnetic layer 20 does not include boron (y=0), it can be understood that the magnetic change due to strain hardly occurs and the GFB is about 0. Thus, it is favorable that the composition ratio y of boron of the second magnetic layer 20 be larger than 0.

As illustrated in FIGS. 3A to 3C, it is favorable that the composition ratio y of boron of the second magnetic layer 20 be larger than 0 and be 0.3 or less. As illustrated in FIGS. 3A to 3C, it is favorable that the composition ratio y of boron of the second magnetic layer 20 be 0.1 or more and 0.3 or less.

Figure 4A:
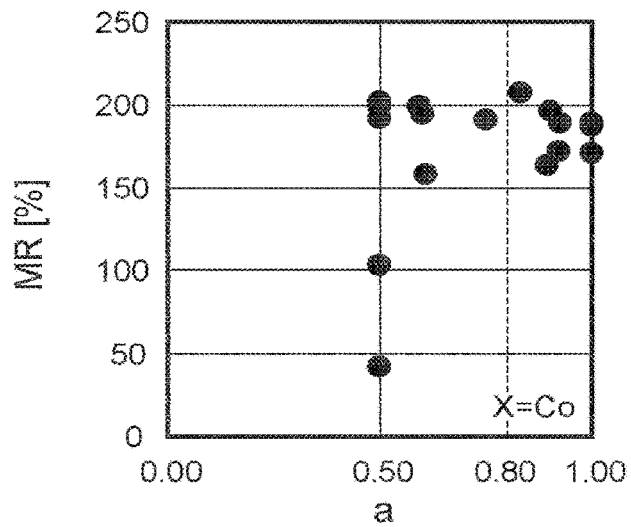
FIGS. 4A to 4C are graphs illustrating an example of another experimental result of the strain sensing element according to the embodiment.
Figure 4B:
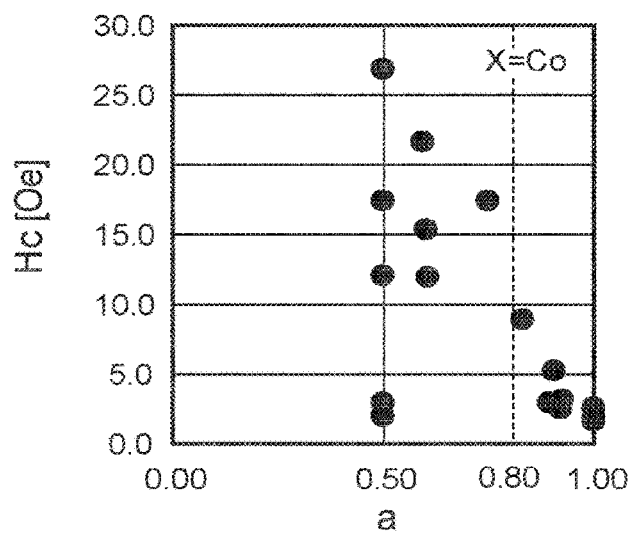
Figure 4C:
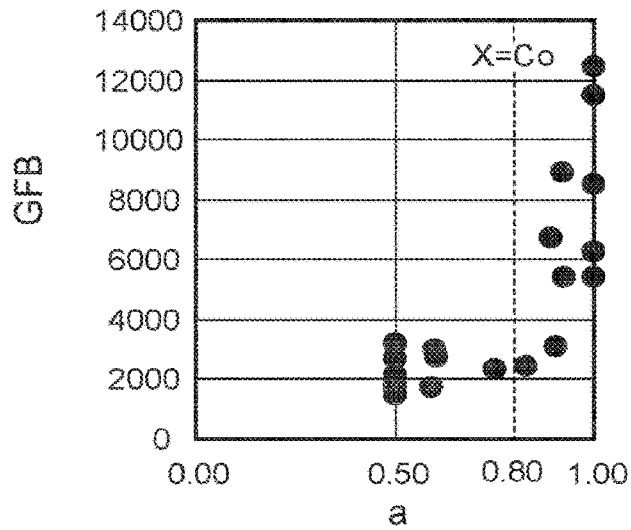

FIGS. 4A to 4C are graphs illustrating an example of another experimental result of the strain sensing element according to the embodiment.

The second magnetic layer 20 of the strain sensing element 100 in the examples of the experimental results in FIGS. 4A to 4C includes $(Fe_aCo_{1-a})_{1-y}B_y$. Here, examples of experimental results relating to a composition ratio a of iron (Fe), in other words, relating to a composition ratio 1-a of cobalt (Co) are as illustrated in FIGS. 4A to 4C.

FIG. 4A is a diagram illustrating an example of the relationship between the MR change ratio and the composition ratio a of iron, in the strain sensing element according to the embodiment. FIG. 4B is a diagram illustrating an example of the relationship between the coercive force $H_c$ and the composition ratio a of iron, in the strain sensing element according to the embodiment. FIG. 4C is a diagram illustrating an example of the relationship between the gauge factor B (GFB) and the composition ratio a of iron.

In the inspection, the composition ratio y of boron is $0.1 \leq y < 0.3$.

As illustrated in FIG. 4C, in a case where the composition ratio a of iron is about 0.8 or more, it can be understood that a GFB of 4000 or more is obtained. In other words, in a case where the composition ratio 1-a of cobalt is about 0.2 or less, it can be understood that the GFB of 4000 or more is obtained. Here, as illustrated in FIG. 4A, it can be understood that a relatively large MR is obtained. As illustrated in FIG. 4B, it can be understood that a relatively small coercive force $H_c$ is obtained. Thus, it is favorable that the composition ratio a of iron of the second magnetic layer 20 be 0.8 or more. In other words, it is favorable that the composition ratio 1-a of cobalt of the second magnetic layer 20 be 0.2 or less.

Figure 5A:
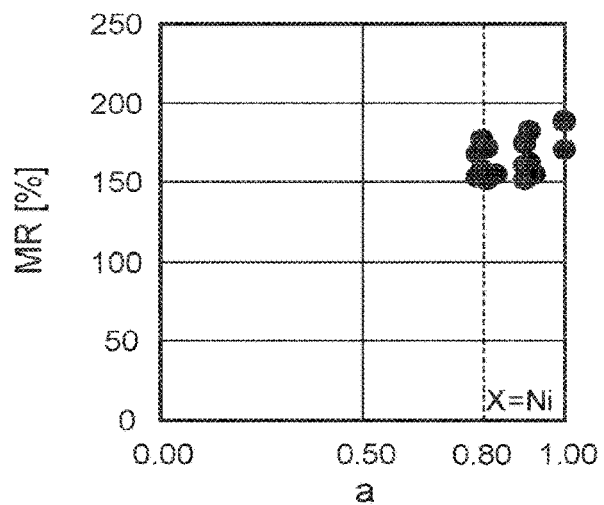
FIGS. 5A to 5C are graphs illustrating examples of other experimental results of the strain sensing element according to the embodiment.
Figure 5B:
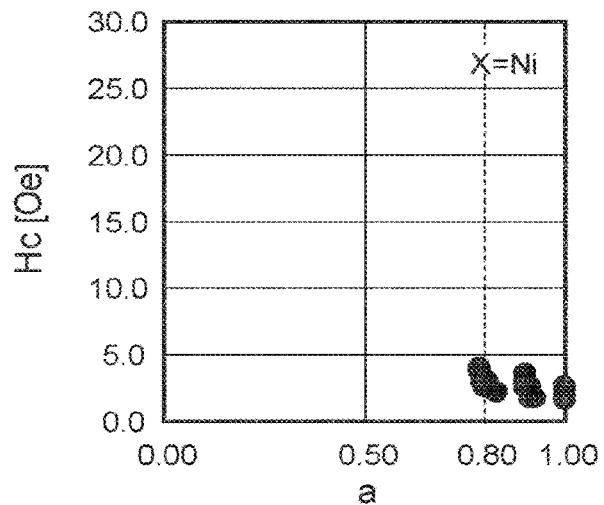
Figure 5C:
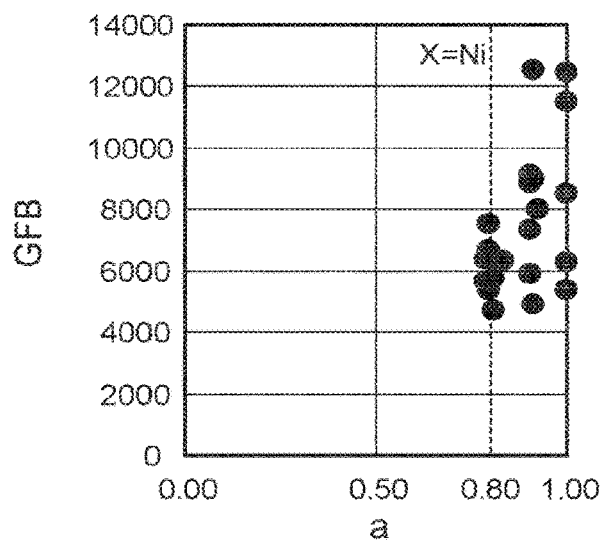

FIGS. 5A to 5C are graphs illustrating examples of other experimental results of the strain sensing element according to the embodiment.

The second magnetic layer 20 of the strain sensing element 100 in the examples of the experimental results in FIGS. 5A to 5C includes $(Fe_aNi_{1-a})_{1-y}B_y$. Here, examples of experimental results relating to a composition ratio a of iron (Fe), in other words, relating to a composition ratio 1-a of nickel (Ni) are as illustrated in FIGS. 5A to 5C.

FIG. 5A is a diagram illustrating an example of the relationship between the MR change ratio and the composition ratio a of iron, in the strain sensing element according to the embodiment. FIG. 5B is a diagram illustrating an example of the relationship between the coercive force $H_c$ and the composition ratio a of iron, in the strain sensing element according to the embodiment. FIG. 5C is a diagram illustrating an example of the relationship between the gauge factor B (GFB) and the composition ratio a of iron.

In the inspection, the composition ratio y of boron is $0.1 \leq y < 0.3$.

As illustrated in FIG. 5C, in a case where the composition ratio a of iron is about 0.8 or more, it can be understood that a GFB of 4000 or more is obtained. In other words, in a case where the composition ratio 1-a of nickel is about 0.2 or less, it can be understood that the GFB of 4000 or more is obtained. Here, as illustrated in FIG. 5A, it can be understood that a relatively large MR is obtained. As illustrated in FIG. 5B, it can be understood that a relatively small coercive force $H_c$ is obtained. Thus, it is favorable that the composition ratio a of iron of the second magnetic layer 20 be 0.8 or more. In other words, it is favorable that the composition ratio 1-a of nickel of the second magnetic layer 20 be 0.2 or less.

Figure 6A:
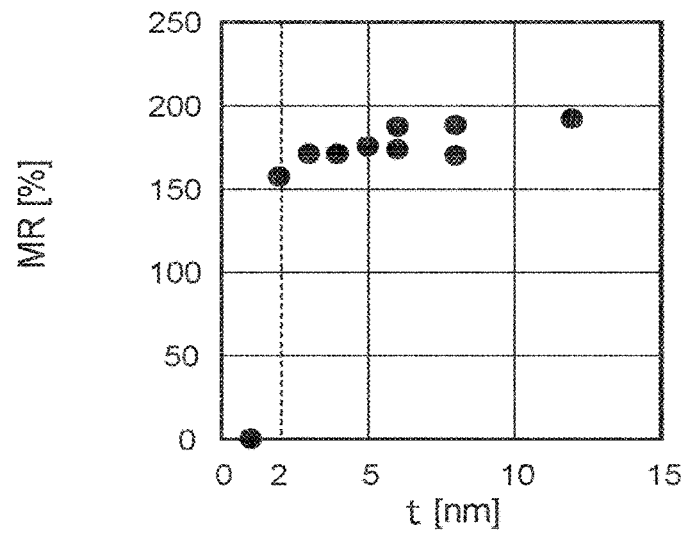
FIGS. 6A to 6C are graphs illustrating examples of other experimental results of the strain sensing element according to the embodiment.
Figure 6B:
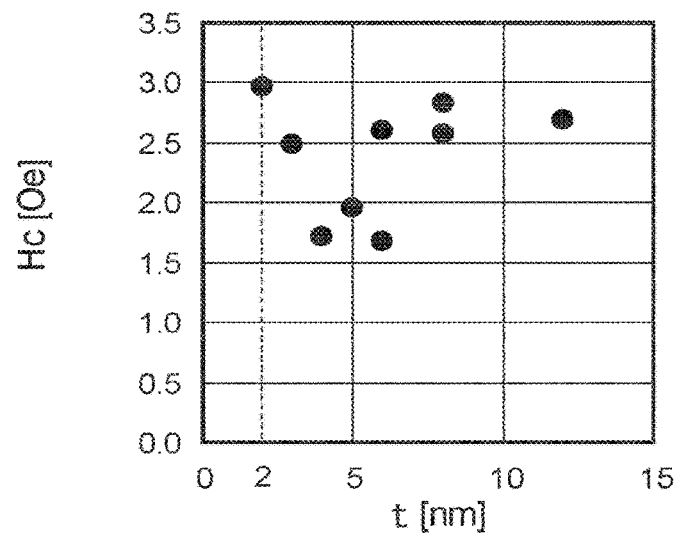
Figure 6C:
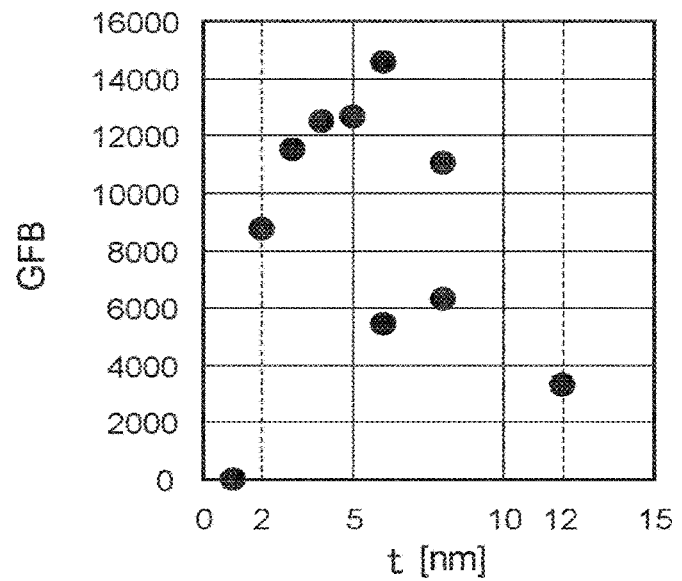

FIGS. 6A to 6C are graphs illustrating examples of other experimental results of the strain sensing element according to the embodiment.

The second magnetic layer 20 of the strain sensing element 100 in the examples of the experimental results in FIGS. 6A to 6C includes $Fe_{1-y}B_y$. Here, examples of experimental results relating to a thickness t of $Fe_{1-y}B_y$ are as illustrated in FIGS. 6A to 6C.

FIG. 6A is a diagram illustrating an example of the relationship between the MR change ratio and the thickness t of $Fe_{1-y}B_y$, in the strain sensing element according to the embodiment. FIG. 6B is a diagram illustrating an example of the relationship between the coercive force $H_c$ and the thickness t of $Fe_{1-y}B_y$, in the strain sensing element according to the embodiment. FIG. 6C is a diagram illustrating an example of the relationship between the gauge factor B (GFB) and the thickness t of $Fe_{1-y}B_y$.

As illustrated in FIG. 6A, in a case where the thickness t of $Fe_{1-y}B_y$ is equal to 2 nm or more, it can be understood that a relatively large MR is obtained. If the thickness t of $Fe_{1-y}B_y$ becomes smaller than 2 nm, the MR is reduced. Then, a sufficient magnetic characteristic may not be obtained. As illustrated in FIG. 6B, in a case where the thickness t of $Fe_{1-y}B_y$ is 2 nm or more, it can be understood that a relatively small coercive force $H_c$ is obtained. As illustrated in FIG. 6C, in a case where the thickness t of $Fe_{1-y}B_y$ is 2 nm or more, it can be understood that a GFB of 4000 or more is obtained. Thus, it is favorable that the thickness t of $Fe_{1-y}B_y$ be 2 nm or more.

In a case where the thickness t of $Fe_{1-y}B_y$ is 2 nm or more, it is possible to maintain the crystallinity of the region that includes the interface 20s in the second magnetic layer 20, and to maintain the amorphous state of the region that does not include the interface 20s in the second magnetic layer 20.

On the other hand, as illustrated in FIG. 6C, in a case where the thickness t of $Fe_{1-y}B_y$ becomes thicker than 12 nm or more, it can be understood that the GFB becomes smaller than 4000 and becomes a relatively small value. Thus, it is favorable that the thickness t of $Fe_{1-y}B_y$ be 12 nm or less.

As illustrated in FIGS. 6A to 6C, it is favorable that the thickness t of $Fe_{1-y}B_y$ be 2 nm or more. As illustrated in FIGS. 6A to 6C, it is favorable that the thickness t of $Fe_{1-y}B_y$ be 2 nm or more and 12 nm or less.

Figure 7A:
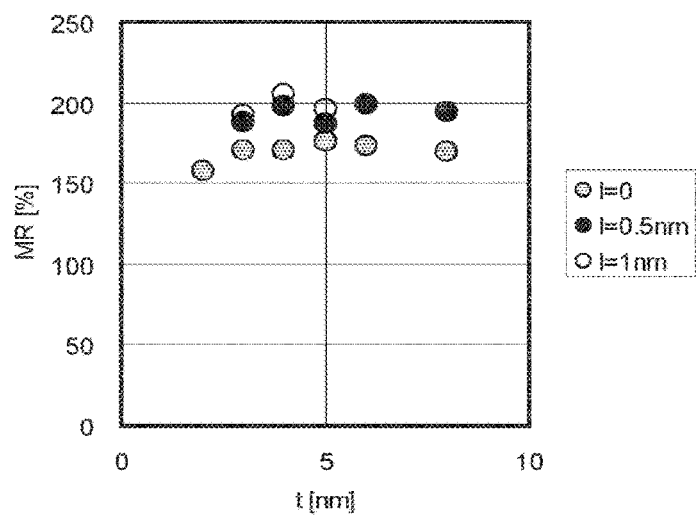
FIGS. 7A to 7C are graphs illustrating examples of other experimental results of the strain sensing element according to the embodiment.
Figure 7B:
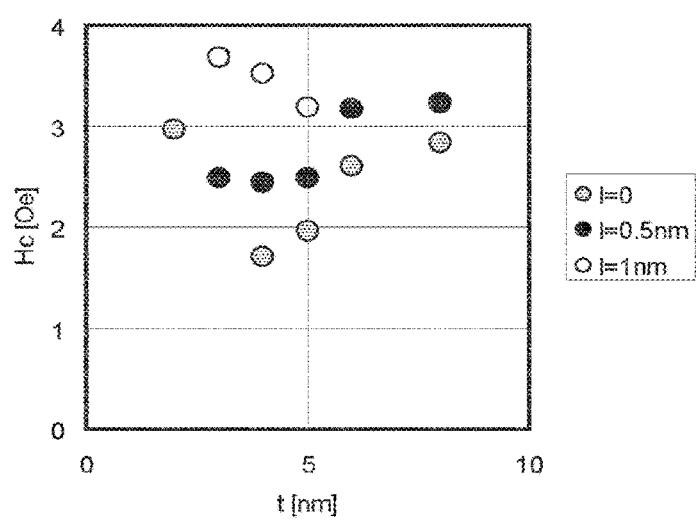
Figure 7C:
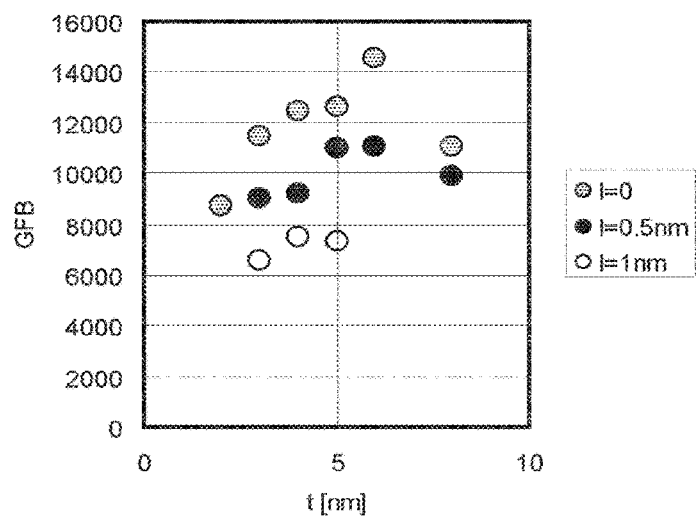

FIGS. 7A to 7C are graphs illustrating examples of other experimental results of the strain sensing element according to the embodiment.

The second magnetic layer 20 of the strain sensing element 100 in the examples of the experimental results in FIGS. 7A to 7C includes both of $Fe_{1-y}B_y$ and $Co_{40}Fe_{40}B_{20}$. Here, $Co_{40}Fe_{40}B_{20}$ is provided in the region that includes the interface 20s. Examples of experimental results relating to a thickness t of $Fe_{1-y}B_y$ are as illustrated in FIGS. 7A to 7C. In the experiment, a thickness I of $Co_{40}Fe_{40}B_{20}$ is set to 0 nm, 0.5 nm, and 1 nm, respectively.

FIG. 7A is a diagram illustrating an example of the relationship between the MR change ratio and the thickness t of $Fe_{1-y}B_y$, in the strain sensing element according to the embodiment. FIG. 7B is a diagram illustrating an example of the relationship between the coercive force $H_c$ and the thickness t of $Fe_{1-y}B_y$, in the strain sensing element according to the embodiment. FIG. 7C is a diagram illustrating an example of the relationship between the gauge factor B (GFB) and the thickness t of $Fe_{1-y}B_y$.

As illustrated in FIG. 7C, in a case where $Co_{40}Fe_{40}B_{20}$ of several nms is provided in the interface 20s, similarly, it can be understood that a GFB of 4000 or more is obtained. This is because a large MR is obtained, compared with a case where only Fe—B is used, as illustrated in FIG. 7A, and because a relatively small coercive force $H_c$ is obtained as illustrated in FIG. 7B. Thus, in a case where both of $Fe_{1-y}B_y$ and $Co_{40}Fe_{40}B_{20}$ are included in the second magnetic layer 20, it is favorable that $Co_{40}Fe_{40}B_{20}$ be provided in the region that includes the interface 20s. By providing $Co_{40}Fe_{40}B_{20}$ to be easily crystallized in the interface, it is possible to increase the MR, and to realize a strain sensor sensitive to the change of the magnetization direction.

Figure 8A:
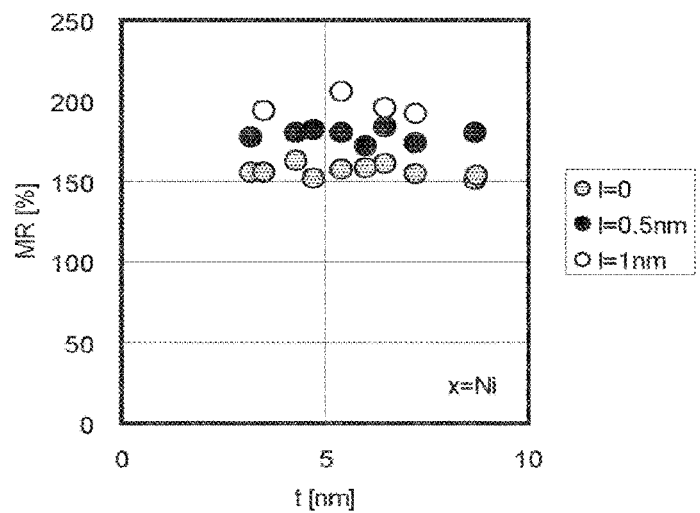
FIGS. 8A to 8C are graphs illustrating examples of other experimental results of the strain sensing element according to the embodiment.
Figure 8B:
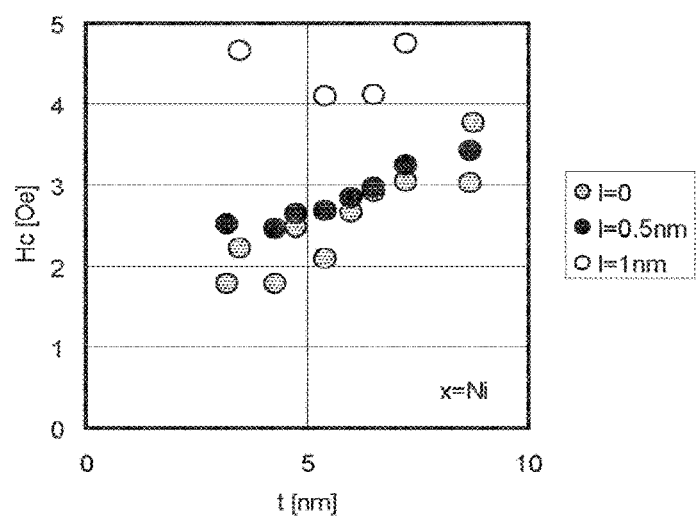
Figure 8C:
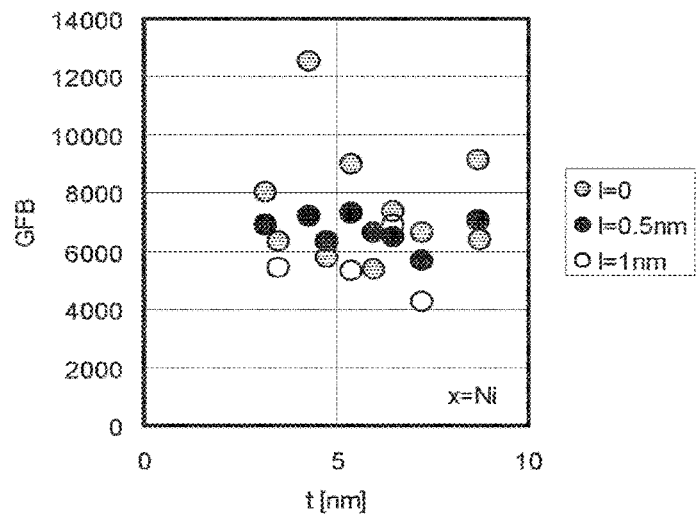

FIGS. 8A to 8C are graphs illustrating examples of other experimental results of the strain sensing element according to the embodiment.

The second magnetic layer 20 of the strain sensing element 100 in the examples of the experimental results in FIGS. 8A to 8C includes both of $(Fe_aNi_{1-a})_{1-y}B_y$ ($0.8 \leq a < 1$, $0 < y \leq 0.3$) and $Co_{40}Fe_{40}B_{20}$. Here, $Co_{40}Fe_{40}B_{20}$ is provided in the region that includes the interface 20s. Examples of experimental results relating to a thickness t of $(Fe_aNi_{1-a})_{1-y}B_y$ ($0.8 \leq a < 1$, $0 < y \leq 0.3$) are as illustrated in FIGS. 8A to 8C. In the experiment, a thickness I of $Co_{40}Fe_{40}B_{20}$ is set to 0 nm, 0.5 nm and 1 nm, respectively.

FIG. 8A is a diagram illustrating an example of the relationship between the MR change ratio and the thickness t of $(Fe_aNi_{1-a})_{1-y}B_y$ ($0.8 \leq a < 1$, $0 < y \leq 0.3$), in the strain sensing element according to the embodiment. FIG. 8B is a diagram illustrating an example of the relationship between the coercive force $H_c$ and the thickness t of $(Fe_aNi_{1-a})_{1-y}B_y$ ($0.8 \leq a < 1$, $0 < y \leq 0.3$), in the strain sensing element according to the embodiment. FIG. 8C is a diagram illustrating an example of the relationship between the gauge factor B (GFB) and the thickness t of $(Fe_aNi_{1-a})_{1-y}B_y$ ($0.8 \leq a < 1$, $0 < y \leq 0.3$).

As illustrated in FIG. 8C, even in a case where $Co_{40}Fe_{40}B_{20}$ of several nms is provided in the interface 20s, similarly, it can be understood that a GFB of 4000 or more is obtained, which may be larger than the GFB in a configuration in which only $(Fe_aNi_{1-a})_{1-y}B_y$ is used. This is because a large MR is obtained, compared with a case where only the $(Fe_aNi_{1-a})_{1-y}B_y$ is used, as illustrated in FIG. 8A, and because a relatively small coercive force $H_c$ is obtained as illustrated in FIG. 8B. In other words, this is because a small amount of increase of the coercive force $H_c$ may be compensated for by the amount of increase of MR. Thus, in a case where both of $(Fe_aNi_{1-a})_{1-y}B_y$ and $Co_{40}Fe_{40}B_{20}$ are included in the second magnetic layer 20, it is desired that $Co_{40}Fe_{40}B_{20}$ be provided in the region that includes the interface 20s. By providing $Co_{40}Fe_{40}B_{20}$ to be easily crystallized in the interface, it is possible to increase the MR, and to realize a strain sensor sensitive to the change of the magnetization direction.

FIGS. 9A to 9D are graphs illustrating examples of other experimental results of the strain sensing element.

Figure 9A:
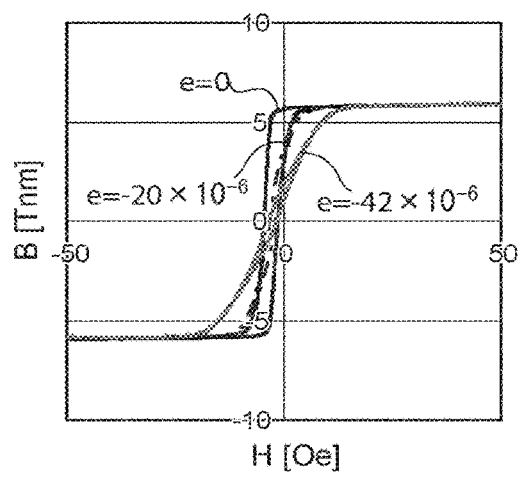
FIGS. 9A to 9D are graphs illustrating examples of other experimental results of the strain sensing element.
Figure 9B:
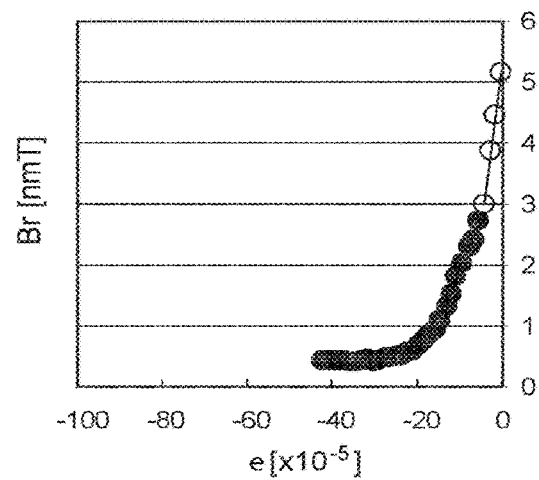

FIG. 9A and FIG. 9B are graphs illustrating examples of other experimental results of the strain sensing element according to the embodiment.

Figure 9C:
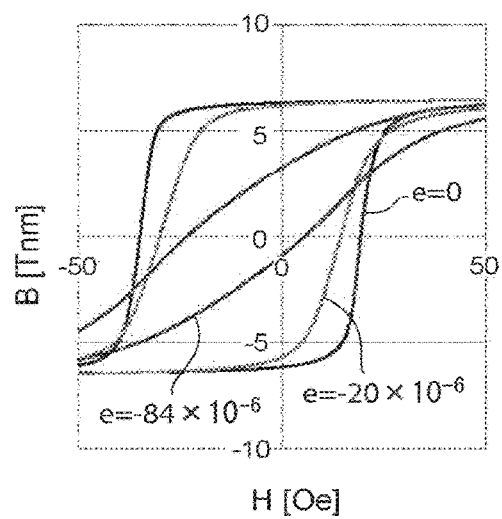
Figure 9D:
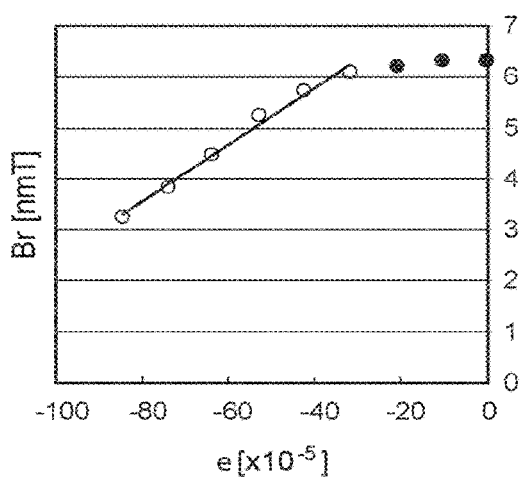

FIG. 9C and FIG. 9D are graphs illustrating examples of other experimental results of a strain sensing element according to a comparative example.

The vertical axis in FIG. 9A and FIG. 9C represents the magnetic thickness (the product of a saturation magnetization Bs and a thickness t (Bs·t)). The horizontal axis in FIG. 9A and FIG. 9C represents a magnetic field. In other words, FIG. 9A and FIG. 9C represent a so-called B-H curve (B-H loop).

The vertical axis in FIG. 9B and FIG. 9D represents a constant magnetic field (in the example, magnetic field of 0). The horizontal axis in FIG. 9B and FIG. 9D represents strain.

The second magnetic layer 20 of the strain sensing element 100 according to the embodiment in the examples of the experimental results in FIG. 9A and FIG. 9B includes $Fe_{1-y}B_y$.

The second magnetic layer 20 of the strain sensing element according to the comparative example in the examples of the experimental results in FIG. 9C and FIG. 9D includes $Co_{40}Fe_{40}B_{20}$.

When the graph of FIG. 9A is compared with the graph of FIG. 9C, the second magnetic layer 20 includes $Fe_{1-y}B_y$, and thus B-H when strain is applied is significantly changed. Thus, when the graph of FIG. 9B is compared with the graph of FIG. 9D, the second magnetic layer 20 includes $Fe_{1-y}B_y$, and thus it is possible to significantly change B in the constant magnetic field due to strain. Thus, according to the magnetic material (material including $Fe_{1-y}B_y$), it is possible to realize a strain sensor of high sensitivity under the condition that a constant amount of boron is included.

The GFB of $Co_{40}Fe_{40}B_{20}$ of the strain sensing element according to the comparative example is about 1500.

FIGS. 10A to 10D are graphs illustrating examples of results of strain sensor characteristics of the strain sensing element according to the embodiment.

Figure 10A:
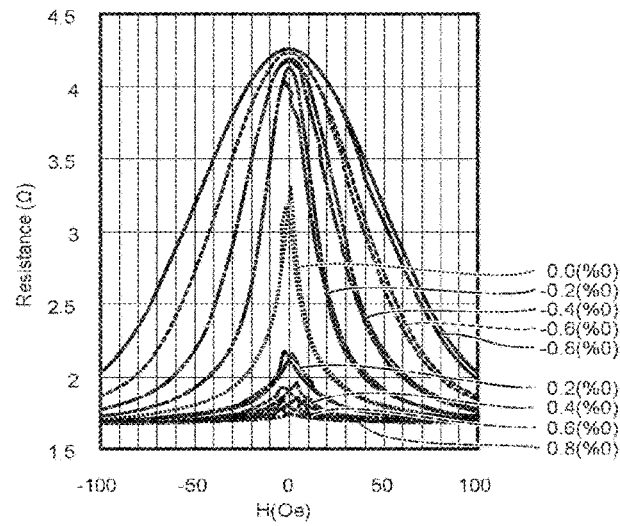
FIGS. 10A to 10D are graphs illustrating examples of results of strain sensor characteristics of the strain sensing element according to the embodiment.

In the example illustrated in FIG. 10A, with respect to the strain sensing element 100 having an element size of 20 μm×20 μm, the strain applied to the strain sensing element 100 is set as a fixed value at 0.2 (‰) intervals between −0.8 (‰) to 0.8 (‰). FIG. 10A illustrates respective examples of results obtained by measuring magnetic field dependency of electrical resistance in respective strains. From FIG. 10A, it can be understood that the shape of an R-H loop is changed by the value of the applied strain. This represents that in-plane magnetic anisotropy of the magnetization free layer is changed by the inverse-magnetostriction effect.

Figure 10B:
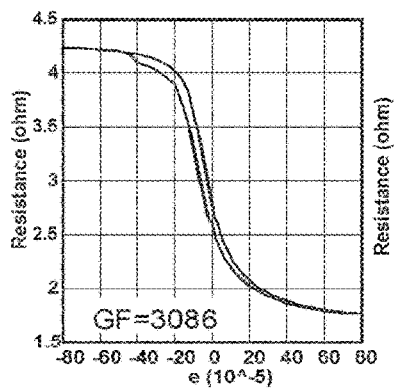
Figure 10C:
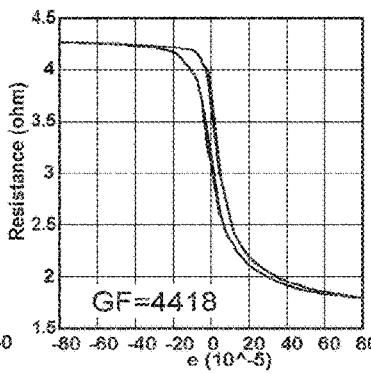
Figure 10D:
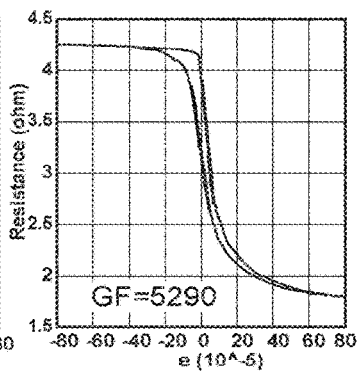

FIGS. 10B to 10D represents changes of electrical resistances in the strain sensing element 100 when an external magnetic field is fixed and strain is continuously swept of between −0.8 (‰) and 0.8 (‰). The strain is swept from −0.8 (‰) to 0.8 (‰), and then, is swept from 0.8 (‰) to −0.8 (‰). These results represent the strain sensor characteristics. In FIG. 10B, evaluation is performed by applying the external magnetic field of 5 Oe. In FIG. 10C, an external magnetic field of 2 Oe is applied to perform the evaluation. In FIG. 10D, the evaluation is performed at 0 Oe.

In the strain sensing element 100 of the embodiment, it is possible to obtain a high gauge factor by applying an appropriate bias magnetic field. The external magnetic field may also be applied by providing a hard bias to a side of the strain sensing element or providing an in-stack bias on an upper portion of the magnetization free layer. In the strain sensing element 100 of the embodiment, the evaluation is performed by simply applying the external magnetic field using a coil. The gauge factor is estimated from the change of the electrical resistance with respect to the strain, from FIGS. 10B to 10D.

The gauge factor is represented by the following expression.

$$GF = (dR/R)/d\varepsilon$$

From FIG. 10B, the gauge factor when the external magnetic field is 5 Oe is 3086. From FIG. 10C, the gauge factor when the external magnetic field is 2 Oe is 4418. From FIG. 10D, the gauge factor when the external magnetic field is 0 Oe is 5290. From these results, the maximum gauge factor (5290) is obtained when the bias magnetic field is 0 Oe.

Figure 11A:
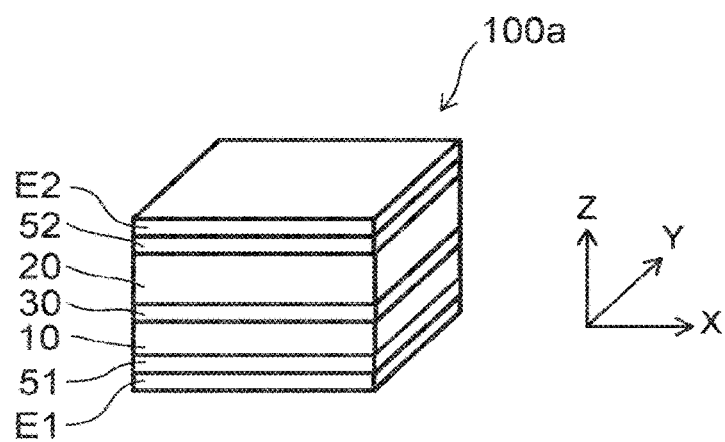
FIG. 11A and FIG. 11B are schematic diagrams illustrating another strain sensing element according to the first embodiment.
Figure 11B:
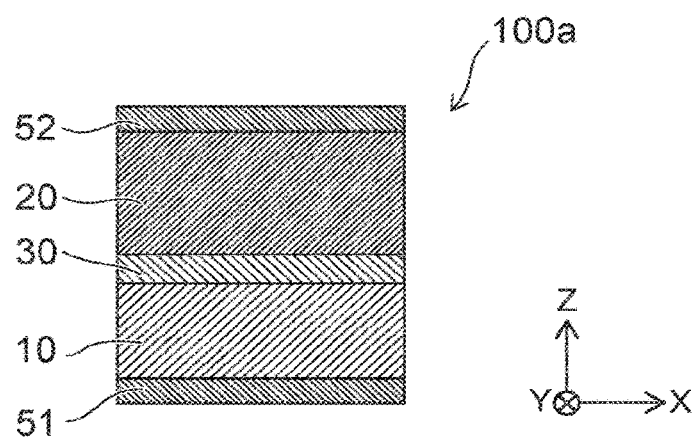

FIG. 11A and FIG. 11B are schematic diagrams illustrating another strain sensing element according to the first embodiment.

FIG. 11A is a schematic perspective view illustrating the strain sensing element. FIG. 11B is a schematic cross-sectional view illustrating the strain sensing element. In FIG. 11B, for ease of description, a first electrode and a second electrode are not shown.

As illustrated in FIG. 11A, a strain sensing element 100a according to the embodiment includes a first magnetic layer 10, a second magnetic layer 20, and an intermediate layer 30. In the example, the strain sensing element 100a further includes a first functional layer 51, a second functional layer 52, a first electrode E1, and a second electrode E2. The first functional 51 and the second functional layer 52 may not be necessarily provided.

In the strain sensing element 100 described above with reference to FIG. 1A and FIG. 1B, the first magnetic layer 10 is the magnetization fixed layer.

On the other hand, in the strain sensing element 100a illustrated in FIG. 11A and FIG. 11B, the first magnetic layer 10 is a magnetization free layer.

In the example, the second electrode E2 is separated from the first electrode E1 in the stacking direction. The first functional layer 51 is provided between the first electrode E1 and the second electrode E2. The functional layer 51 includes a non-magnetic layer or any material except for a non-magnetic material. The first magnetic layer 10 is provided between the first functional layer 51 and the second electrode E2. The intermediate layer 30 is provided between the first magnetic layer 10 and the second electrode E2. The second magnetic layer 20 is provided between the intermediate layer 30 and the second electrode E2. The second functional layer 52 is provided between the second magnetic layer 20 and the second electrode E2. The functional layer 52 includes a non-magnetic layer or any material except for a non-magnetic material.

In the strain sensing element 100a illustrated in FIG. 11A and FIG. 11B, the first magnetic layer 10 includes a ferromagnetic material. The first magnetic layer 10 includes the same material as that of the second magnetic layer 20 described above with reference to FIG. 1A and FIG. 1B.

That is, in the example, the first magnetic layer 10 includes $Fe_{1-y}B_y$ (0<y≤0.3). Alternatively, the first magnetic layer 10 includes $(Fe_aX_{1-a})_{1-y}B_y$ (0.8≤a<1, 0<y≤0.3). Alternatively, the first magnetic layer 10 includes both of $Fe_{1-y}B_y$ (0≤y<0.3) and $(Fe_aX_{1-a})_{1-y}B_y$ (0.8≤a<1, 0<y≤0.3). In $(Fe_aX_{1-a})_{1-y}B_y$, X is Co or Ni.

The first functional layer 51 includes the same material as that of the functional layer 40 described above with reference to FIG. 1A and FIG. 1B. The second functional layer 52 includes the same material as that of the functional layer 40 described above with reference to FIG. 1A and FIG. 1B.

The second magnetic layer 20 is as described with reference to FIG. 1A and FIG. 1B. The intermediate layer 30 is as described with reference to FIG. 1A and FIG. 1B. The first electrode E1 is as described with reference to FIG. 1A and FIG. 1B. The second electrode E2 is as described with reference to FIG. 1A and FIG. 1B.

In the strain sensing element 100a according to the embodiment, similar to the strain sensing element 100 according to the embodiment, it is possible to obtain magnetostriction, soft magnetic property and magnetic resistance effect together, and to achieve improvement of the sensitivity of the strain sensing element 100a.

The magnetization fixed layer and the pinning layer (not shown) described above with reference to FIG. 1A and FIG. 1B may be provided to at least one of between the first functional layer 51 and the first electrode E1 and between the second functional layer 52 and the second electrode E2.

Second Embodiment

A second embodiment relates to a pressure sensor. In the pressure sensor, at least one of the strain sensing elements 100 and 100a according to the first embodiment and a strain sensing element of a modification thereof is used. Hereinafter, a case where the strain sensing element 100 is used as the strain sensing element will be described.

Figure 12A:
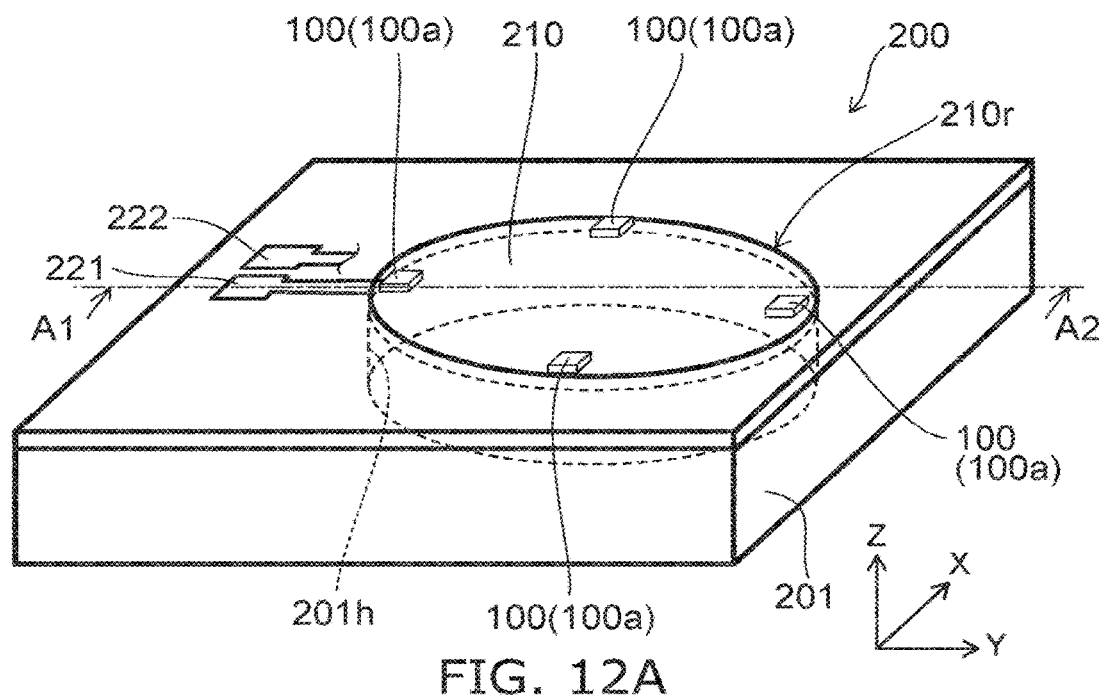
FIG. 12A and FIG. 12B are schematic perspective views illustrating a pressure sensor according to the second embodiment.
Figure 12B:
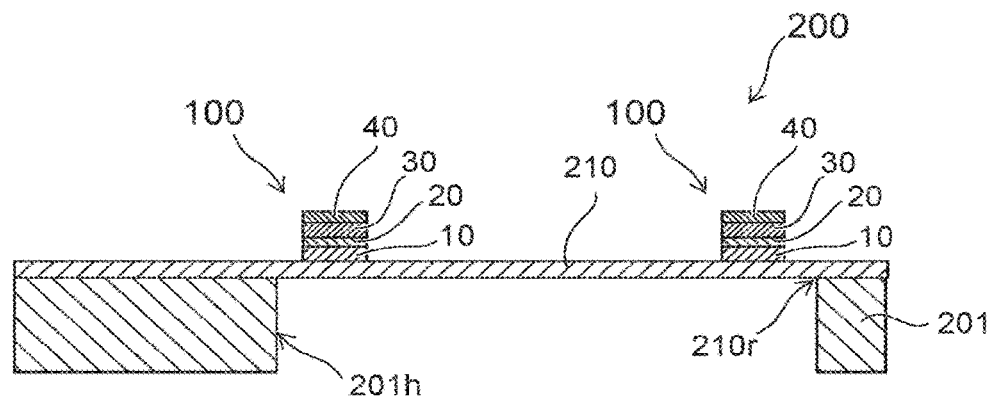

FIG. 12A and FIG. 12B are schematic perspective views illustrating a pressure sensor according to the second embodiment.

FIG. 12A is a schematic perspective view. FIG. 12B is a cross-sectional view taken along the line A1-A2 in FIG. 12A.

As illustrated in FIG. 12A and FIG. 12B, a pressure sensor 200 according to the embodiment includes a substrate 210 and a strain sensing element 100.

As illustrated in FIG. 12A and FIG. 12B, the pressure sensor 200 according to the embodiment includes a support unit 201, the substrate 210, and the strain sensing element 100.

The substrate 210 is supported by the support unit 201. The substrate 210 has, for example, a flexible region. The substrate 210 is, for example, a diaphragm. The substrate 210 may be integrally formed with the support unit 201 or may be provided separately therefrom. The substrate 210 may include the same material as that of the support unit 201, or a material different from that of the support unit 201. A portion of the support unit 201 may be removed, so that the substrate 210 may be the thin portion of the support unit 201.

The thickness of the substrate 210 is thinner than the thickness of the support unit 201. In a case where the substrate 210 and the support unit 201 may include the same material, and in a case where the substrate 210 and the support unit 201 are integrally formed, the thin portion is used as the substrate 210, and the thick portion is used as the support unit 201.

The support unit 201 may have a through-hole 201h formed through the support unit 201 in the thickness direction, and the substrate 210 may be provided to cover the through-hole 201h. In such a case, for example, the film of the material used to form the substrate 210 may extend onto a portion of the support unit 201 other than the through-hole 201h. In such a case, the portion that overlaps the through-hole 201h, in the film of the material used as the substrate 210, is used as the substrate 210.

The substrate 210 has an outer edge 210r. In a case where the substrate 210 and the support unit 201 include the same material and are integrally formed, the outer edge of the thin portion is used as the outer edge 210r of the substrate 210. In a case where the support unit 201 has the through-hole 201h formed through the support unit 201 in the thickness direction and the substrate 210 is provided to cover the through-hole 201h, the outer edge of the portion that overlaps the through-hole 201h, in the film of the material used as the substrate 210, is used as the outer edge 210r of the substrate 210.

The support unit 201 may continuously support the outer edge 210r of the substrate 210, or may support a part of the outer edge 210r of the substrate 210.

The strain sensing element 100 is provided on the substrate 210. For example, the strain sensing element 100 is provided on a part of the substrate 210. In the example, plural strain sensing elements 100 are provided on the substrate 210. The number of the strain sensing elements provided on the film part may be 1.

A first interconnect 221 and a second interconnect 222 are provided in the pressure sensor 200 illustrated in FIG. 12A and FIG. 12B. The first interconnect 221 is connected to the strain sensing element 100. The second interconnect 222 is connected to the strain sensing element 100. For example, an inter-layer insulating film is provided between the first interconnect 221 and the second interconnect 222 to electrically insulate the first interconnect 221 from the second interconnect 222. A voltage is applied between the first interconnect 221 and the second interconnect 222, and thus, the voltage is applied to the strain sensing elements 100 through the first interconnect 221 and the second interconnect 222. If pressure is applied to the pressure sensor 200, the substrate 210 is deformed. In the strain sensing element 100, an electrical resistance R is changed as the substrate 210 is deformed. It is possible to sense the pressure by sensing the change of the electrical resistance R through the first interconnect 221 and the second interconnect 222.

The support unit 201 may include, for example, a plate-shaped substrate. A hollow part (through-hole 201h) is provided inside the substrate, for example.

The support unit 201 may include, for example, a semiconductor material such as silicon, a conductive material such as a metal, or an insulating material. The support unit 201 may include silicon oxide or silicon nitride, for example. The inside of the hollow part (through-hole 201h) is in a decompression state (vacuum state), for example. The inside of the hollow part (through-hole 201h) may be filled with gas such as air, or liquid. The inside of the hollow part (through-hole 201h) may be designed so that the substrate 210 can be bent. The inside of the hollow part (through-hole 201h) may be connected to the outside atmosphere.

The substrate 210 is provided on the hollow part (through-hole 201h). A portion of the support unit 201 may be thinly machined to be used as the substrate 210. The thickness of the substrate 210 (the thickness in the z-axis direction) is thinner than the thickness of the support unit 201, the thickness in the z-axis direction.

If pressure is applied to the substrate 210, the substrate 210 is deformed. The pressure corresponds to pressure to be sensed by the pressure sensor 200. The applied pressure includes pressure due to sound waves, ultrasonic waves or the like. In a case where the pressure due to the sound waves, the ultrasonic waves or the like is sensed, the pressure sensor 200 functions as a microphone.

The substrate 210 includes, for example, an insulating material. The substrate 210 includes at least one selected from silicon oxide, silicon nitride and silicon oxynitride, for example. The substrate 210 may include, for example, a metallic material.

The thickness of the substrate 210 is 0.1 μm or more and 3 μm or less, for example. It is favorable that the thickness be 0.2 μm or more and 1.5 μm or less. The substrate 210 may include a stacked layer of a silicon oxide film having a thickness of 0.2 μm and a silicon film having a thickness of 0.4 μm.

Hereinafter, an example of a method for manufacturing a pressure sensor according to the embodiment will be described. An example of a method for manufacturing a pressure sensor will be described.

FIGS. 13A to 13E are schematic cross-sectional diagrams sequentially illustrating the process of the method for manufacturing the pressure sensor according to the embodiment.

Figure 13A:
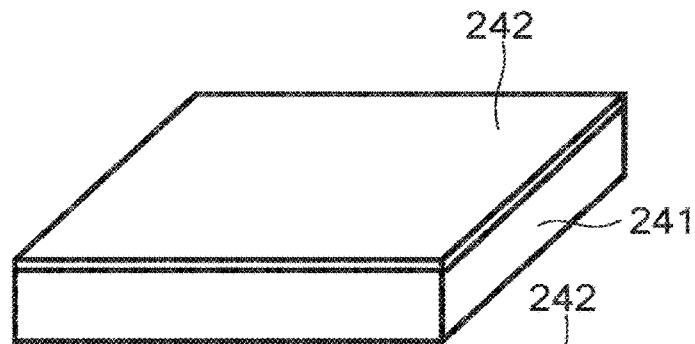
FIGS. 13A to 13E are schematic cross-sectional diagrams sequentially illustrating the process of the method for manufacturing the pressure sensor according to the embodiment.

As illustrated in FIG. 13A, a thin film 242 is formed on a substrate 241 (for example, Si substrate). The substrate 241 is used as the support unit 201. The thin film 242 is used as the substrate 210.

For example, the thin film 242 of $SiO_x/Si$ is formed on a Si substrate by sputtering. An $SiO_x$ single layer, a SiN single layer or a metal layer such as Al may be used as the thin film 242. Further, a flexible plastic material such as a polyimide or a paraxylylene-based polymer may be used as the thin film 242, for example. A silicon on insulator (SOI) substrate may be used as the substrate 241 and the thin film 242. In the SOI, for example, a stacked film of $SiO_2/Si$ is formed on the Si substrate by bonding of substrates.

Figure 13B:
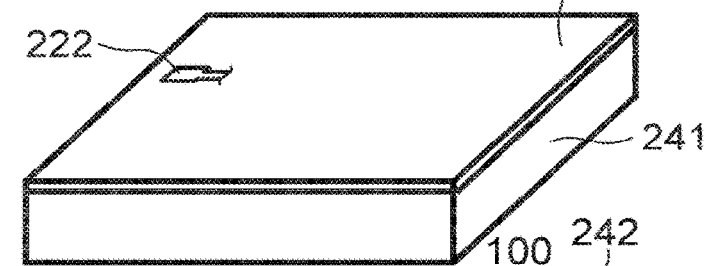

As illustrated in FIG. 13B, the second interconnect 222 is formed. In the process, a conductive film that is used as the second interconnect 222 is formed, and then, the conductive film is patterned by photolithography and etching. In a case where an insulating film is filled around the second interconnect 222, lift-off processing may be applied. In the lift-off processing, for example, the insulating film is formed on the entire surface after etching the pattern of the second interconnect 222 and prior to peeling the resist, and then, the resist is removed.

Figure 13C:
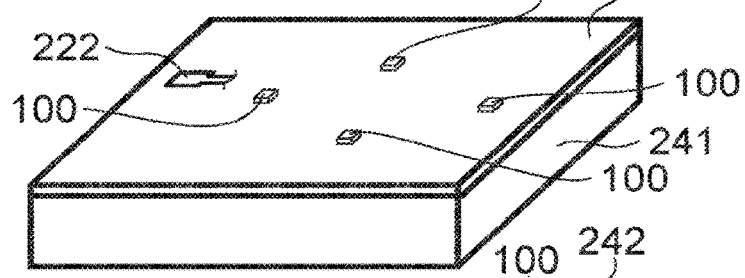

As illustrated in FIG. 13C, the strain sensing element 100 is formed. In the process, a stacked film that is used as the strain sensing element 100 is formed, and then, the stacked film is patterned by photolithography and etching. In a case where the side wall of the stacked body of the strain sensing element 100 is embedded in the insulating layer, lift-off processing may be applied. In the lift-off processing, for example, the insulating layer is formed on the entire surface after patterning the stacked body and prior to peeling the resist, and then, the resist is removed.

Figure 13D:
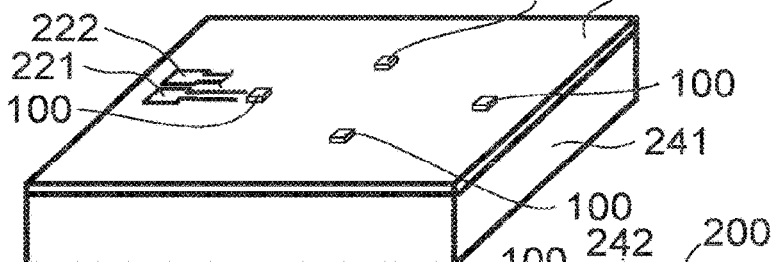

As illustrated in FIG. 13D, the first interconnect 221 is formed. In the process, a conductive film that is used as the first interconnect 221 is formed, and then, the conductive film is patterned by photolithography and etching. In a case where an insulating film is filled around the first interconnect 221, a lift-off processing may be applied. In the lift-off processing, the insulating film is formed on the entire surface after patterning the first interconnect 221 and prior to peeling the resist, and then, the resist is removed.

Figure 13E:
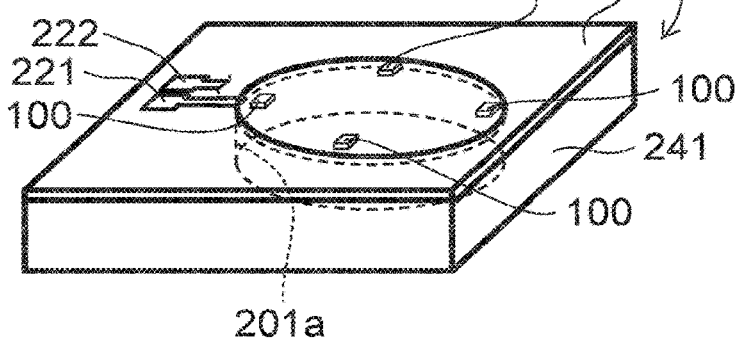

As illustrated in FIG. 13E, the hollow portion 201a is formed by performing etching from the back surface of the substrate 241. Thus, the substrate 210 and the support unit 201 are formed. For example, in a case where the stacked film of $SiO_x/Si$ is used as the thin film 242 used to form the substrate 210, deep patterning of the substrate 241 is performed from the back surface (the lower surface) of the thin film 242 toward the front surface (the upper surface) of the thin film 242. Thus, the hollow portion 201a is formed. For example, a double-sided aligner exposure apparatus may be used to form the hollow portion 201a. Thus, it is possible to form the hole pattern of the resist in the back surface to match the position of the strain sensing element 100 on the front surface.

A Bosch process using, for example, RIE may be used to etch the Si substrate. In the Bosch process, for example, an etching process using $SF_6$ gas and a deposition process using $C_4F_8$ gas are repeated. Thus, selective etching of the substrate 241 in the depth direction (the Z-axis direction) is performed while suppressing the etching of the side wall of the substrate 241. For example, an $SiO_x$ layer is used as an end point of the etching. In other words, the etching is stopped using the $SiO_x$ layer having a selection ratio different from that of Si. The $SiO_x$ layer that functions as the etching stopper layer may be used as a portion of the substrate 210. After the etching, the $SiO_x$ layer may be removed, for example, by processing of anhydrous hydrogen fluoride, alcohol, or the like.

In this manner, the pressure sensor 200 according to the embodiment is formed. The other pressure sensors according to the embodiments may also be manufactured by similar methods.

Third Embodiment

Figure 14:
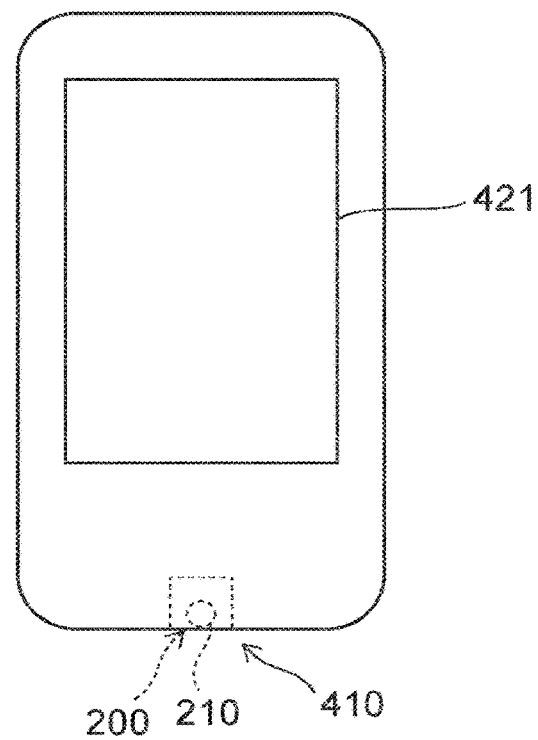
FIG. 14 is a schematic plan view illustrating a microphone according to a third embodiment.

FIG. 14 is a schematic plan view illustrating a microphone according to a third embodiment.

As illustrated in FIG. 14, a microphone 410 includes any pressure sensor (for example, the pressure sensor 200) according to the embodiments described above or a pressure sensor according to a modification of these pressure sensors. Hereinafter, the microphone 410 that includes the pressure sensor 200 will be described as an example.

The microphone 410 is embedded in an end portion of a personal digital assistant 420. The substrate 210 of the pressure sensor 200 that is provided in the microphone 410 may be substantially parallel to, for example, a surface of the personal digital assistant 420 where a display unit 421 is provided. The disposition of the substrate 210 is not limited to the above illustration and may be appropriately modified.

Since the microphone 410 includes the pressure sensor 200 or the like, it is possible to achieve high sensitivity with respect to frequencies in a wide band.

Further, a case where the microphone 410 is embedded in the personal digital assistant 420 is illustrated, but this is not limitative. The microphone 410 may also be embedded in, for example, an IC recorder, a pin microphone, or the like.

Fourth Embodiment

The embodiment relates to an acoustic microphone using the pressure sensor of the embodiments described above.

Figure 15:
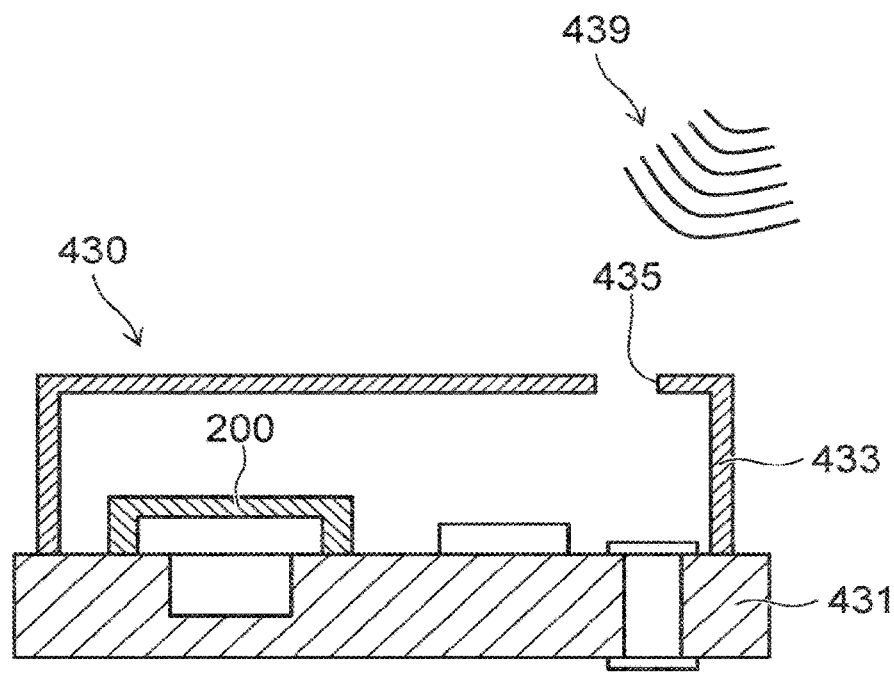
FIG. 15 is a schematic cross-sectional view illustrating the acoustic microphone according to a fourth embodiment.

FIG. 15 is a schematic cross-sectional view illustrating the acoustic microphone according to a fourth embodiment.

An acoustic microphone 430 according to the embodiment includes a printed circuit board 431, a cover 433, and the pressure sensor 200. The printed circuit board 431 includes, for example, a circuit such as an amplifier. An acoustic hole 435 is provided in the cover 433. Sound 439 passes through the acoustic hole 435 to enter the inside of the cover 433.

Any of the pressure sensors described in regard to the embodiments described above or a pressure sensor according to a modification of these pressure sensors may be used as the pressure sensor 200.

The acoustic microphone 430 responds to sound pressure. The acoustic microphone 430 of high sensitivity is obtained by using the pressure sensor 200 of high sensitivity. For example, the pressure sensor 200 is mounted on the printed circuit board 431, and then, electrical signal lines are provided. The cover 433 is provided on the printed circuit board 431 to cover the pressure sensor 200.

According to the embodiment, it is possible to provide an acoustic microphone of high sensitivity.

Fifth Embodiment

The embodiment relates to a blood pressure sensor using the pressure sensor of the embodiments described above.

FIG. 16A and FIG. 16B are schematic views illustrating the blood pressure sensor according to a fifth embodiment.

FIG. 16A is a schematic plan view illustrating the skin over the arterial vessel of a human. FIG. 16B is a cross-sectional view taken along the line H1-H2 of FIG. 16A.

In the embodiment, the pressure sensor 200 is used as a blood pressure sensor 440. The pressure sensor 200 includes any of the pressure sensors described in regard to the embodiments described above or a pressure sensor according to a modification of these pressure sensors.

Thus, it is possible to perform highly-sensitive pressure sensing by a small size pressure sensor. The blood pressure sensor 440 can perform a continuous blood pressure measurement by the pressure sensor 200 being pressed onto a skin 443 over an arterial vessel 441.

According to the embodiment, it is possible to provide a blood pressure sensor of high sensitivity.

Sixth Embodiment

The embodiment relates to a touch panel using the pressure sensor of the embodiments described above.

FIG. 17 is a schematic plan view illustrating a touch panel according to a sixth embodiment.

In the embodiment, the pressure sensor 200 may be used in a touch panel 450. The pressure sensor 200 includes any of the pressure sensors described in regard to the embodiments described above or a pressure sensor according to a modification of these pressure sensors. In the touch panel 450, the pressure sensor 200 is mounted in the interior of either the display or outside the display.

For example, the touch panel 450 includes plural first interconnects 451, plural second interconnects 452, the plural pressure sensors 200, and a controller 453.

In the example, the plural first interconnects 451 are arranged along the Y-axis direction. Each of the plural first interconnects 451 extends along the X-axis direction. The plural second interconnects 452 are arranged along the X-axis direction. Each of the plural second interconnects 452 extends along the Y-axis direction.

The plural pressure sensors 200 are provided respectively at intersection portions between the plural first interconnects 451 and the plural second interconnects 452. One pressure sensor 200 is used as one sensing component 200e for sensing. Herein, the intersection portions include positions where the first interconnects 451 and the second interconnects 452 intersect with each other and peripheral regions thereof.

One end 261 of each of the plural pressure sensors 200 is connected to each of the plural first interconnects 451. The other end 262 of each of the plural pressure sensors 200 is connected to each of the plural second interconnects 452.

The controller 453 is connected to the plural first interconnects 451 and the plural second interconnects 452.

For example, the controller 453 includes a first interconnect circuit 453a that is connected to the plural first interconnects 451, a second interconnect circuit 453b that is connected to the plural second interconnects 452, and a control circuit 455 that is connected to the first interconnect circuit 453a and the second interconnect circuit 453b.

The pressure sensor 200 having a small size can perform highly-sensitive pressure sensing. Thus, it is possible to realize a high definition touch panel.

Other than the applications described above, the pressure sensors according to the embodiments described above are applicable to various pressure sensor devices such as an atmospheric pressure sensor, an air pressure sensor of a tire.

According to the embodiments, it is possible to provide a strain sensing element of high sensitivity, a pressure sensor, a microphone, a blood pressure sensor, and a touch panel.

Hereinabove, the embodiments of the invention are described with reference to the specific examples. However, the invention is not limited to the specific examples. For example, specific configurations of the respective components such as the substrate, the strain sensing element, the first magnetic layer, the second magnetic layer, the intermediate layer and the functional layer included in the strain sensing element, the pressure sensor, the microphone, the blood pressure sensor and the touch panel are included in the scope of the invention as long as the specific configurations can be appropriately selected by those skilled in the art from known techniques to realize the invention in the same way and to achieve the same results.

Further, combinations of two or more components of the respective specific examples in a technically allowable range are also included in the scope of the invention in a range without departing from the spirit of the invention.

In addition, all strain sensing elements, pressure sensors, microphones, blood pressure sensors and touch panels obtainable by an appropriate design modification by those skilled in the art based on the strain sensing elements, the pressure sensors, the microphones, the blood pressure sensors and the touch panels described above as the embodiments of the invention also are included in the scope of the invention in a range without departing from the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Hereinabove, the embodiments of the invention are described. The embodiments of the invention may be embodied in the following embodiments.

Embodiment 1

A strain sensing element provided on a deformable substrate, comprising:
a first magnetic layer;
a second magnetic layer including $Fe_{1-y}B_y$ ($0<y\leq0.3$), in which magnetization changes according to deformation of the substrate; and
an intermediate layer provided between the first magnetic layer and the second magnetic layer.

Embodiment 2

The element according to embodiment 1, wherein
the second magnetic layer further includes $(Fe_aCo_{1-a})_{1-y}B_y$ ($0.8\leq a<1$, and $0<y\leq0.3$), and
the $(Fe_aCo_{1-a})_{1-y}B_y$ ($0.8\leq a<1$, and $0<y\leq0.3$) is provided in a region that includes an interface between the second magnetic layer and the intermediate layer, the region being in the second magnetic layer.

Embodiment 3

The element according to embodiment 1, wherein
the first magnetic layer includes $(Fe_aX_{1-a})_{1-y}B_y$ (X being Co or Ni, $0.8\leq a<1$, and $0<y\leq0.3$), and
magnetization of the first magnetic layer changes according to deformation of the substrate.

Embodiment 4

The element according to embodiment 3, wherein
a thickness of the $(Fe_aX_{1-a})_{1-y}B_y$ (X being Co or Ni, $0.8\leq a<1$, and $0<y\leq0.3$) of the first magnetic layer is 2 nm or more and 12 nm or less.

Embodiment 5

The element according to embodiment 1, wherein
the first magnetic layer includes $Fe_{1-y}B_y$ ($0<y\leq0.3$), and
magnetization of the first magnetic layer changes according to deformation of the substrate.

Embodiment 6

The element according to embodiment 5, wherein
the $Fe_{1-y}B_y$ ($0<y\leq0.3$) of the first magnetic layer includes an amorphous portion.

Embodiment 7

The element according to embodiment 5, wherein
the first magnetic layer further includes $(Fe_aX_{1-a})_{1-y}B_y$ (X being Co or Ni, $0.8\leq a<1$, and $0<y\leq0.3$), and
the $(Fe_aX_{1-a})_{1-y}B_y$ (X being Co or Ni, $0.8\leq a<1$, and $0<y\leq0.3$) is provided in a region that includes an interface between the first magnetic layer and the intermediate layer, the region being in the first magnetic layer.

Embodiment 8

The element according to embodiment 7, wherein
the $(Fe_aX_{1-a})_{1-y}B_y$ (X being Co or Ni, $0.8\leq a<1$, and $0<y\leq0.3$) of the first magnetic layer includes an amorphous portion.

Embodiment 9

A microphone comprising a pressure sensor,
the pressure sensor including:
a support unit;
a substrate supported by the support unit, the substrate being deformable; and
a strain sensing element provided on the substrate, the strain sensing element including
a first magnetic layer,
a second magnetic layer including $Fe_{1-y}B_y$ ($0<y\leq0.3$), in which magnetization changes according to deformation of the substrate, and
an intermediate layer provided between the first magnetic layer and the second magnetic layer.

Embodiment 10

A blood pressure sensor comprising a pressure sensor, the pressure sensor including:
a support unit;
a substrate supported by the support unit, the substrate being deformable; and
a strain sensing element provided on the substrate, the strain sensing element including
a first magnetic layer,
a second magnetic layer including $Fe_{1-y}B_y$ ($0<y\leq0.3$), in which magnetization changes according to deformation of the substrate, and
an intermediate layer provided between the first magnetic layer and the second magnetic layer.

Embodiment 11

A touch panel comprising a pressure sensor, the pressure sensor including:
a support unit;
a substrate supported by the support unit, the substrate being deformable; and
a strain sensing element provided on the substrate, the strain sensing element including
a first magnetic layer,
a second magnetic layer including $Fe_{1-y}B_y$ ($0<y\leq0.3$), in which magnetization changes according to deformation of the substrate, and
an intermediate layer provided between the first magnetic layer and the second magnetic layer.

What is claimed is:

1. A strain sensing element provided on a deformable substrate, comprising:
a first magnetic layer;
a second magnetic layer including $Fe_{1-y}B_y$ ($0<y\leq0.3$); and
an intermediate layer provided between the first magnetic layer and the second magnetic layer,
wherein a first part of the $Fe_{1-y}B_y$ ($0<y\leq0.3$) is amorphous and a second part of the $Fe_{1-y}B_y$ ($0<y\leq0.3$) is not amorphous.

2. The element according to claim 1, wherein
the $Fe_{1-y}B_y$ ($0<y\leq0.3$) is provided in a region that includes an interface between the second magnetic layer and the intermediate layer, the region being in the second magnetic layer.

3. The element according to claim 1, wherein
a thickness of the $Fe_{1-y}B_y$ ($0<y\leq0.3$) is 2 nm or more and 12 nm or less.

4. The element according to claim 1, further comprising
a functional layer including MgO, the second magnetic layer being provided between the intermediate layer and the functional layer.

5. The element according to claim 1, wherein
the second magnetic layer further includes $Co_{40}Fe_{40}B_{20}$, and the $Co_{40}Fe_{40}B_{20}$ is provided in a region that includes an interface between the second magnetic layer and the intermediate layer, the region being in the second magnetic layer.

6. The element according to claim 1, wherein
the first magnetic layer includes $Fe_{1-y}B_y$ ($0<y\leq0.3$), and magnetization of the first magnetic layer changes according to deformation of the substrate.

7. The element according to claim 6, wherein
the $Fe_{1-y}B_y$ ($0<y\leq0.3$) of the first magnetic layer is provided in a region that includes an interface between the first magnetic layer and the intermediate layer, the region being in the first magnetic layer.

8. The element according to claim 6, wherein
a thickness of the $Fe_{1-y}B_y$ ($0<y\leq0.3$) of the first magnetic layer is 2 nm or more and 12 nm or less.

9. The element according to claim 6 wherein
the first magnetic layer further includes $(Fe_aX_{1-a})_{1-y}B_y$ (X being Co or Ni, $0.8\leq a<1$, and $0<y\leq0.3$), and
the $(Fe_aX_{1-a})_{1-y}B_y$ (X being Co or Ni, $0.8\leq a<1$, and $0<y\leq0.3$) is provided in a region that includes an interface between the first magnetic layer and the intermediate layer, the region being in the first magnetic layer.

10. The element according to claim 1, wherein
the first magnetic layer includes $(Fe_aX_{1-a})_{1-y}B_y$ (X being Co or Ni, $0.8\leq a<1$, and $0<y\leq0.3$), and
magnetization of the first magnetic layer changes according to deformation of the substrate.

11. The element according to claim 10, wherein
the $(Fe_aX_{1-a})_{1-y}B_y$ (X being Co or Ni, $0.8\leq a<1$, and $0<y\leq0.3$) of the first magnetic layer is provided in a region that includes an interface between the first magnetic layer and the intermediate layer, the region being in the first magnetic layer.

12. The element according to claim 10, wherein
the first magnetic layer further includes $Fe_{1-y}B_y$ ($0<y\leq0.3$).

13. The element according to claim 1, wherein the second part of the $Fe_{1-y}B_y$ ($0<y\leq0.3$) is crystalline and is disposed in a first region of the second magnetic layer that includes an interface between the second magnetic layer and the intermediate layer, and wherein the first part of the $Fe_{1-y}B_y$ ($0<y\leq0.3$) that is amorphous is disposed in a second region of the magnetic layer that does not include the interface.

14. A strain sensing element provided on a deformable substrate, comprising:
a first magnetic layer;
a second magnetic layer including $(Fe_aX_{1-a})_{1-y}B_y$ (X being Co or Ni, $0.8\leq a<1$, and $0<y\leq0.3$); and
an intermediate layer provided between the first magnetic layer and the second magnetic layer,
wherein a first part of the $(Fe_aX_{1-a})_{1-y}B_y$ (X being Co or Ni, $0.8\leq a<1$, and $0<y\leq0.3$) is amorphous and a second part of the $(Fe_aX_{1-a})_{1-y}B_y$ is not amorphous.

15. The element according to claim 14, wherein
the $(Fe_aX_{1-a})_{1-y}B_y$ (X being Co or Ni, $0.8\leq a<1$, and $0<y\leq0.3$) is provided in a region that includes an interface between the second magnetic layer and the intermediate layer, the region being in the second magnetic layer.

16. The element according to claim 14, wherein
a thickness of the $(Fe_aX_{1-a})_{1-y}B_y$ (X being Co or Ni, $0.8\leq a<1$, and $0<y\leq0.3$) is 2 nm or more and 12 nm or less.

17. The element according to claim 14, wherein
the second magnetic layer further includes $Fe_{1-y}B_y$ ($0<y\leq0.3$).

18. The element according to claim 14, wherein
the X is Ni,
the second magnetic layer further includes $Co_{40}Fe_{40}B_{20}$, and
the $Co_{40}Fe_{40}B_{20}$ is provided in a region that includes an interface between the second magnetic layer and the intermediate layer, the region being in the second magnetic layer.

19. A strain sensing element provided on a deformable substrate, comprising:
a first magnetic layer;
a second magnetic layer including $(Fe_aNi_{1-a})_{1-y}B_y$ ($0.8 \leq a < 1$, and $0 < y \leq 0.3$); and
an intermediate layer provided between the first magnetic layer and the second magnetic layer,
wherein a first part of the $(Fe_aNi_{1-a})_{1-y}B_y$ ($0.8 \leq a < 1$, and $0 < y \leq 0.3$) is amorphous and a second part of the $(Fe_aNi_{1-a})_{1-y}B_y$ is not amorphous.

* * * * *